US012706890B2

(12) United States Patent
Hafiz et al.

(10) Patent No.: US 12,706,890 B2
(45) Date of Patent: Aug. 11, 2026

(54) SECURE AND EFFICIENT MANAGEMENT OF MICROSERVICES

(71) Applicant: BOLD Limited, Hamilton (BM)

(72) Inventors: Umar Afzal Hafiz, Srinagar (IN); Baroon Anand, New Delhi (IN)

(73) Assignee: BOLD Limited, Hamilton (BM)

( * ) Notice: Subject to any disclaimer, the term of this patent is extended or adjusted under 35 U.S.C. 154(b) by 39 days.

(21) Appl. No.: 18/829,469

(22) Filed: Sep. 10, 2024

(65) Prior Publication Data

US 2026/0075040 A1 Mar. 12, 2026

(51) Int. Cl.
*H04L 9/40* (2022.01)
*G06F 9/54* (2006.01)

(52) U.S. Cl.
CPC .......... *H04L 63/0428* (2013.01); *G06F 9/547* (2013.01)

(58) Field of Classification Search
CPC . H04L 63/04; H04L 63/0428; H04L 63/0471; H04L 63/0884; H04L 63/10; H04L 65/1101; H04L 65/1108; H04L 67/02; H04L 67/146; H04L 67/50; H04L 67/56; H04L 67/561; H04L 67/564; H04L 67/565; H04L 67/567; H04L 67/60; H04L 2463/041; H04L 2209/76; G06F 9/547; G06F 21/602; G06F 21/606; G06F 21/62; G06F 21/6209; G06F 21/6218; H04W 88/182
See application file for complete search history.

(56) References Cited

U.S. PATENT DOCUMENTS 6,049,877 A * 4/2000 White ..................... G06F 21/31 713/172
10,257,171 B2 * 4/2019 Lyons ................. H04L 63/0442
(Continued)

FOREIGN PATENT DOCUMENTS

CN 112019332 A * 12/2020 ......... H04L 63/0428
EP 3535949 B1 * 6/2020 ............. H04L 67/56
(Continued)

OTHER PUBLICATIONS

Kong Gateway. URL: https://konghq.com/products/kong-gateway (accessed Sep. 9, 2024).
(Continued)

*Primary Examiner* — Oscar A Louie
(74) *Attorney, Agent, or Firm* — Dinsmore & Shohl LLP

(57) ABSTRACT

Certain aspects of the present disclosure provide techniques for secure and efficient management of a plurality of microservices. Certain aspects include receiving, from a first client device, a first request to call a target service Application Programming Interface (API), wherein: a first body of the first request is encrypted, and the first request comprises a first Uniform Resource Locator (URL) path comprising a first identifier associated with the target service API; generating a decrypted first request by decrypting the first request to call the target service API; determining the target service API based on the first identifier; generating a transformed first request by applying one or more transforms to the decrypted first request according to one or more first configured request transformation rules; and sending the transformed first request to the target service API.

20 Claims, 9 Drawing Sheets

(56) References Cited

U.S. PATENT DOCUMENTS

| | | | | |
|---|---|---|---|---|
| 10,664,615 | B1 * | 5/2020 | Schenkein | H04L 63/0281 |
| 11,252,140 | B2 * | 2/2022 | Vudathu | H04L 63/0442 |
| 11,425,129 | B1 * | 8/2022 | Oliker | H04L 63/14 |
| 2014/0281487 | A1 * | 9/2014 | Klausen | H04L 63/04<br>713/153 |
| 2015/0103827 | A1 * | 4/2015 | Quinn | H04L 49/70<br>370/392 |
| 2017/0141926 | A1 * | 5/2017 | Xu | H04L 9/3066 |
| 2019/0036878 | A1 * | 1/2019 | Morrison | G06F 16/9566 |
| 2020/0106763 | A1 * | 4/2020 | Pancholi | H04L 9/3213 |
| 2020/0236187 | A1 * | 7/2020 | Tal | H04L 63/0281 |
| 2021/0067341 | A1 * | 3/2021 | Haque | H04L 9/14 |
| 2023/0396438 | A1 * | 12/2023 | Mahoney | H04L 9/0825 |
| 2025/0045441 | A1 * | 2/2025 | Roper, Jr. | G06F 21/6218 |
| 2025/0053685 | A1 * | 2/2025 | Hall | G06F 21/6254 |
| 2025/0106195 | A1 * | 3/2025 | Robbins | H04L 63/0807 |
| 2025/0365340 | A1 * | 11/2025 | Rombs | H04L 67/02 |

FOREIGN PATENT DOCUMENTS

| | | | | |
|---|---|---|---|---|
| JP | 2019074835 | A * | 5/2019 | |
| WO | WO-0198936 | A2 * | 12/2001 | H04L 67/1001 |

OTHER PUBLICATIONS

Ocelot. URL: https://github.com/ThreeMammals/Ocelot (accessed Sep. 9, 2024).

Azure API Gateway. URL: https://learn.microsoft.com/en-us/azure/api-management/api-management-gateways-overview (accessed Sep. 9, 2024).

New Relic. URL: https://newrelic.com (accessed Sep. 9, 2024).

* cited by examiner

SECURE AND EFFICIENT MANAGEMENT OF MICROSERVICES

BACKGROUND

Field

Aspects of the present disclosure relate to secure and efficient management of microservices.

Description of Related Art

A microservice architecture provides software functionality through a plurality of "microservices" rather than a monolithic software application. Each microservice may be configured to perform one or more functions of a "front-end" software application, such as a web-based application, and each microservice can be developed, deployed, and maintained independently of other microservices. Microservice architectures beneficially reduce dependencies in the overall code base of an application and allow for more rapid development and deployment of new functionality. Often, interaction with and amongst the microservices is enabled by one or more Application Programming Interfaces (APIs).

There is a need in the art for improved techniques for managing microservices.

SUMMARY

Certain aspects provide a method for management of microservices, comprising: receiving, from a first client device, a first request to call a target service Application Programming Interface (API), wherein: a first body of the first request is encrypted, and the first request comprises a first Uniform Resource Locator (URL) path comprising a first identifier associated with the target service API; generating a decrypted first request by decrypting the first request to call the target service API; determining the target service API based on the first identifier; generating a transformed first request by applying one or more transforms to the decrypted first request according to one or more first configured request transformation rules, including one or more of: transforming the first URL path of the decrypted first request to a second URL path of the decrypted first request; transforming a first header of the decrypted first request to a second header of the decrypted first request; transforming the first body of the decrypted first request to a second body of the decrypted first request; or transforming a first cookie of the decrypted first request to a second cookie of the decrypted first request; and sending the transformed first request to the target service API.

Other aspects provide a method, comprising: receiving, from a client device, a request to call a target service API; retrieving, from a data repository, a first structured configuration data comprising service mapping data and a second structured configuration data comprising transformation rule data; parsing the request to call the target service API to determine a plurality of portions of the request, wherein the request comprises one or more of: a first URL comprising: a base URL that is not encrypted, and a URL path comprising an identifier associated with the target service API, a header, a body, or a cookie, wherein the URL path and the body are encrypted; generating a second URL by rewriting at least a portion of the first URL based on the service mapping data, wherein the second URL is associated with the target service API; generating a decrypted request by decrypting the URL path of the request and the body of the request; determining the target service API based on the identifier; identifying one or more applicable transformation rules of the transformation rule data, applicable for the request, based on at least one of the determined portions of the request; generating a transformed request by transforming, based on the identified one or more applicable transformation rules, one or more of: the URL path, the header, the body, or the cookie; and sending the transformed request to the target service API based on the second URL.

Other aspects provide processing systems configured to perform the aforementioned methods as well as those described herein; non-transitory, computer-readable mediums comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
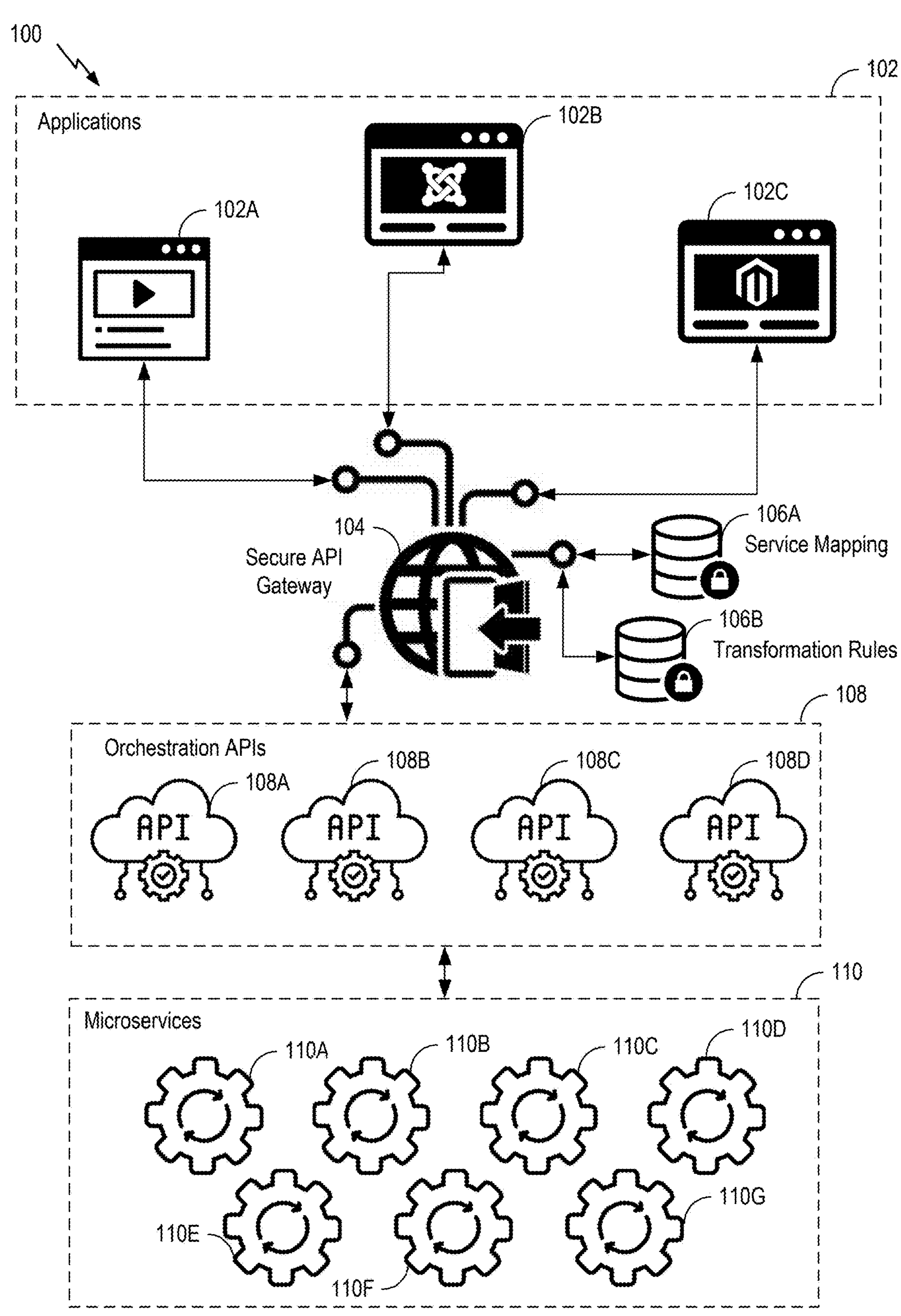
FIG. 1 depicts an example computing environment in which a secure API gateway is configured to enable secure communication between applications and microservices.

Aspects of the present disclosure provide apparatuses, methods, processing systems, and computer-readable mediums for secure and efficient management of microservices.

A benefit of a microservice architecture is that a "back-end" microservice abstracts functionality that may be useful across multiple "front-end" software applications. Thus, microservices can be efficiently reused among software applications. While such reuse allows for building software applications on top of the microservices quickly, it requires a way to connect new software applications to the existing microservices. It also exposes the microservices and the software architecture generally to more threats via its reuse.

For example, malicious actors may intercept data between front-end software applications and back-end microservices, determine patterns in the data, and deduce information regarding the underlying software architecture for exploitation, such as information regarding the back-end microservices and associated APIs. This information (e.g., including details related to the actual destination or connection of API calls) may potentially enable the malicious actors to launch disruptive attacks on the microservice architecture, such as denial of service type attacks.

Aspects of the present disclosure improve security in a microservice architecture by including a gateway that enables secure communication between front-end applications (e.g., websites implementing software services for end users) and one or more back-end microservices (e.g., which provide functionality for the software applications). The gateway improves security using multiple technical improvements.

For example, the gateway is configured to receive encrypted API requests that are purposefully generated (prior to encryption) to obfuscate information regarding the underlying microservice architecture. For example, an API request's URL, header, body, cookies, and/or other aspects may include "transformed" information, which is generated by the sender (e.g., a front-end application) to obfuscate the information regarding the underlying microservice architecture in a way only known to the gateway. As such, the gateway may decrypt and then transform certain aspects of the API request (e.g., to reverse the obfuscation in the API request's URL, header, body, cookies, and/or other aspects) prior to sending data onto a back-end service via an API. For example, the gateway may use transformation rules to transform the inbound request data in a way that makes it suitable for downstream APIs and microservices. Similarly, the gateway may use a microservice mapping (e.g., a service mapping that may be stored as a mapping table, etc.) to determine an appropriate API and microservice for data forwarding based on an identifier included with the API request. Because the service mapping and transformation rules are known only to the front-end application and the gateway (e.g., by an API contract between the front-end application and the gateway, which is used for the development of the front-end application and the gateway and defines the structure of data to be exchanged between the front-end application and the gateway), a bad actor cannot deduce information that would allow for exploitation or disruption of the microservice architecture even if the data is intercepted. Moreover, the encryption (e.g., end-to-end encryption between the front-end application and the gateway) and the control over request and response transformation provide complete anonymity (e.g., without a visual trace) and detached architecture of microservices.

Another technical benefit of the gateway is it allows a single entry point for communications with back-end microservices from any number of front-end applications, including applications maintained by multiple entities. This gateway thus enables easy extensibility of the back-end microservices to new applications within an organization, and to entirely new organizations (such as acquired organizations). In this way, the gateway supports multitenancy across entities, including support for multiple languages and multiple countries. Moreover, the gateway allows changes to be made to the back-end microservices (e.g., changes in URL paths associated with the back-end microservices, etc.) without impacting the operation on the front-end application for accessing the back-end microservices. For example, the service mapping and/or the transformation rules used by the gateway can be updated to enable the gateway to apply appropriate URL rewrites and/or data transformations to API requests from the front-end application, such that the front-end application can access the back-end microservices via the changed URL paths, etc. without requiring any change on the operation of the front-end application.

Accordingly, aspects described herein improve security and extensibility of microservice architectures. Notably, these technical benefits are achieved with minimal overhead as the service mapping (e.g., in mapping tables) and the transformation rules are computationally efficient to implement and effective in their operation.

Example Computing Environment

FIG. 1 depicts an example computing environment 100 in which secure API gateway 104 is configured to enable secure communication between software applications and microservices.

In particular, secure API gateway 104 controls the communication between front-end applications 102A-C (e.g., collectively referred to as applications 102) and shared back-end microservices 110A-G (e.g., collectively referred to as microservices 110 and alternatively referred to as platform microservices). Applications 102 may be native or web-based and executed by various types of computing devices, including desktop, mobile, and server computing devices.

Secure API gateway 104 is in data communication with first data repository 106A and second data repository 106B. First data repository 106A stores service mapping, and second data repository 106B stores transformation rules, where the service mapping and the transformation rules are used by secure API gateway 104 for securing communications. Each of first data repository 106A and second data repository 106B may be any data storage medium configured to store data, such as a database or the like. In some embodiments, first data repository 106A and/or second data repository 106B, at least in part, may be implemented as a local cache memory or a remote memory. The service mapping and the transformation rules may be stored in various formats, including structured data formats like JavaScript Object Notation (JSON) format. While the service mapping and the transformation rules are depicted in FIG. 1 as being stored on, respectively, first data repository 106A and second data repository 106B, in certain aspects, they may be stored as a single configuration file on the same data repository.

Service mapping defines the mapping between an identifier included in the URL of a request received from application 102 and a URL associated with an API that communicates with a target microservice of the request. For example, the mapping may be defined as a property (e.g., a key-value pair) of a JSON file, or any other format that associates the identifier included in the request URL and the actual URL associated with the target microservice. The request may be parsed by secure API gateway 104 to determine the identifier included in the request, and secure API gateway 104 may identify the actual URL of the target microservice to use for an API call for the target microservice based on the service mapping. In certain aspects, the service mapping may be organized based on identifiers associated with microservices that are used by multiple websites (e.g., where the same identifiers may be mapped to different URLs, depending on the websites), and/or based on specific identifiers (associated with URLs for specific microservices) that are only used by certain website(s).

Transformation rules define text replacement rules associated with multiple parts of requests and responses processed by secure API gateway 104. For example, the transformation rules include specific text replacement rules for various portions of the requests and responses (e.g., a portion of URL, referred to as a URL path, associated with a specific microservice, header, cookie, body data path and/or structure, etc.). The text replacement rules may provide a first text associated with a source information and a second text associated with a destination information. For example, the source information may include the text included in the "pre-transformation" version of requests and responses, while the destination information may include the text to include in the "post-transformation" version of requests and responses, where the "post-transformation" text replaces the "pre-transformation" text. Such transformation may be defined for various portions of the request (e.g., URL path associated with a microservice, request header, request body, request cookie, etc.) and various portions of the response (e.g., response header, response body, response cookie, etc.). In certain aspects, the text replacement rules define text replacements for names of microservices as well as associated paths and other structural aspects (e.g., order of data, etc.) corresponding to information to be included in, for example, the body of the requests and responses.

Secure API gateway 104 is further in data communication with orchestration APIs 108A-D (e.g., collectively referred to as APIs 108). APIs 108 provide the data interfaces to microservices 110 such that data may be provided to and received from microservices 110. APIs 108 may support various methods, including Hypertext Transfer Protocol (HTTP) methods, such as GET, POST, PUT, PATCH, and/or DELETE, corresponding to creating, retrieving, modifying, deleting, etc. of data stored and/or accessible by microservices 110. APIs 108 receive API calls from secure API gateway 104 after being decrypted and transformed. In certain aspects, APIs 108 and/or microservices 110 may implemented as cloud-based services.

Generally, applications 102 may send API requests to secure API gateway 104 for processing to be performed by microservices 110. Applications 102 may also receive API responses from secure API gateway 104 with data generated by microservices 110.

For example, application 102A may send an API request (e.g., a HTTP request) for processing by microservice 110B. The API request sent by application 102A includes encrypted data that is decrypted and transformed by secure API gateway 104 according to transformation rules (e.g., stored in second data repository 106B) in order to generate an appropriate API call for microservice 110B. Secure API gateway 104 sends the transformed API request to microservice 110B via one of the APIs 108 and thereafter receives a response, which is then transformed and encrypted prior to sending back to application 102A. This process is discussed in more detail with respect to FIGS. 2-5B.

The architecture of computing environment 100 enables multiple applications 102 to utilize shared microservices 110 in a multitenant fashion. For example, multiple websites operated by the same or different entities (e.g., having different web domains) may provide services (e.g., document generation) using the functionality provided by microservices 110. Beneficially, secure API gateway 104 acts as a single entry point for all API interactions among the multiple applications 102.

In some aspects, secure API gateway 104 may be configured to detect repeated timeouts or failures related to certain API calls, and limit such API calls, thereby providing a "circuit breaker" like service for increased reliability of overall architecture. Secure API gateway 104 may be further configured to log and store (e.g., in first data repository 106A or second data repository 106B) data regarding API usage patterns related to various applications 102, which can then be used to identify optimizations of the architecture.

In some aspects, by using the service mapping and the transformation rules (e.g., stored and accessed from first data repository 106A and second data repository 106B), secure API gateway 104 may mitigate the need for OPTIONS requests (e.g., additional requests to determine whether a particular method for an API call may be available for a microservice 110) and support a Cross-Origin Resource Sharing (CORS) mechanism.

In some aspects, secure API gateway 104 may support rate limiting of API calls. Rate limiting may be based on, for example, one or more configuration settings, historical trends measured over a configured period of time (e.g., past month), time of day, response size, total processing time, central processing unit (CPU) memory change in a given period of time, and API endpoint (e.g., microservices 110). Rate limiting may also be based on one or more of the following modes: (1) request type/URL mode (e.g., if this mode is enabled, the rate limiting is performed based on a particular URL, such as associated with a microservice 110, where secure API gateway 104 may only construct and call a particular API 108 when the particular API 108 has at least a threshold amount of resource availability, based on previous trends of sending request to the particular API); (2) request domain mode (e.g., if this mode is enabled, the rate limiting is performed based on domain associated with a particular API request); and (3) connected client mode (e.g., if this mode is enabled, the rate limiting is performed based on an Internet Protocol (IP) address or other identification of the requesting application).

In some aspects, secure API gateway 104 may be configured to send detail(s) about a requesting application 102, such as authorization detail(s), in a request for a microservice, which may persist and omit the need for further authentication processing, and which beneficially reduces latency.

In some aspects, secure API gateway 104 may support caching of information related to certain service mappings. For example, secure API gateway 104 may use historical data to determine which APIs are called frequently by requesting applications 102. For example, if certain ones of APIs 108 are called, for example, over a threshold number of times per configured unit of time, secure API gateway 104 may cache the related service mapping information in a local cache memory, such that the entirety of the service mapping (e.g., stored on first data repository 106A) does not need to be accessed or searched to identify the mapping between the associated identifiers and such APIs. Beneficially, this feature may reduce overall load on microservices 110 and increase response times for such API calls.

In some aspects, secure API gateway 104 may support generation and reporting of analytics, such as regarding API usage, microservice performance, patterns, etc. The stored data may be customized to API call(s) associated with a particular product or business.

As described above, aspects of the present disclosure provide many technical benefits in managing microservices (e.g., microservices 110) securely and efficiently. For example, some aspects secure the communication between applications 102 and microservices 110 by implementing end-to-end encryption and various transformations of the exchanged data, while improving extensibility and reliability of the microservice architecture by ways of various features related to monitoring the performance of microservices and mitigating overload on any particular microservice(s).

Example Configuration of a Secure API Gateway

Figure 2:
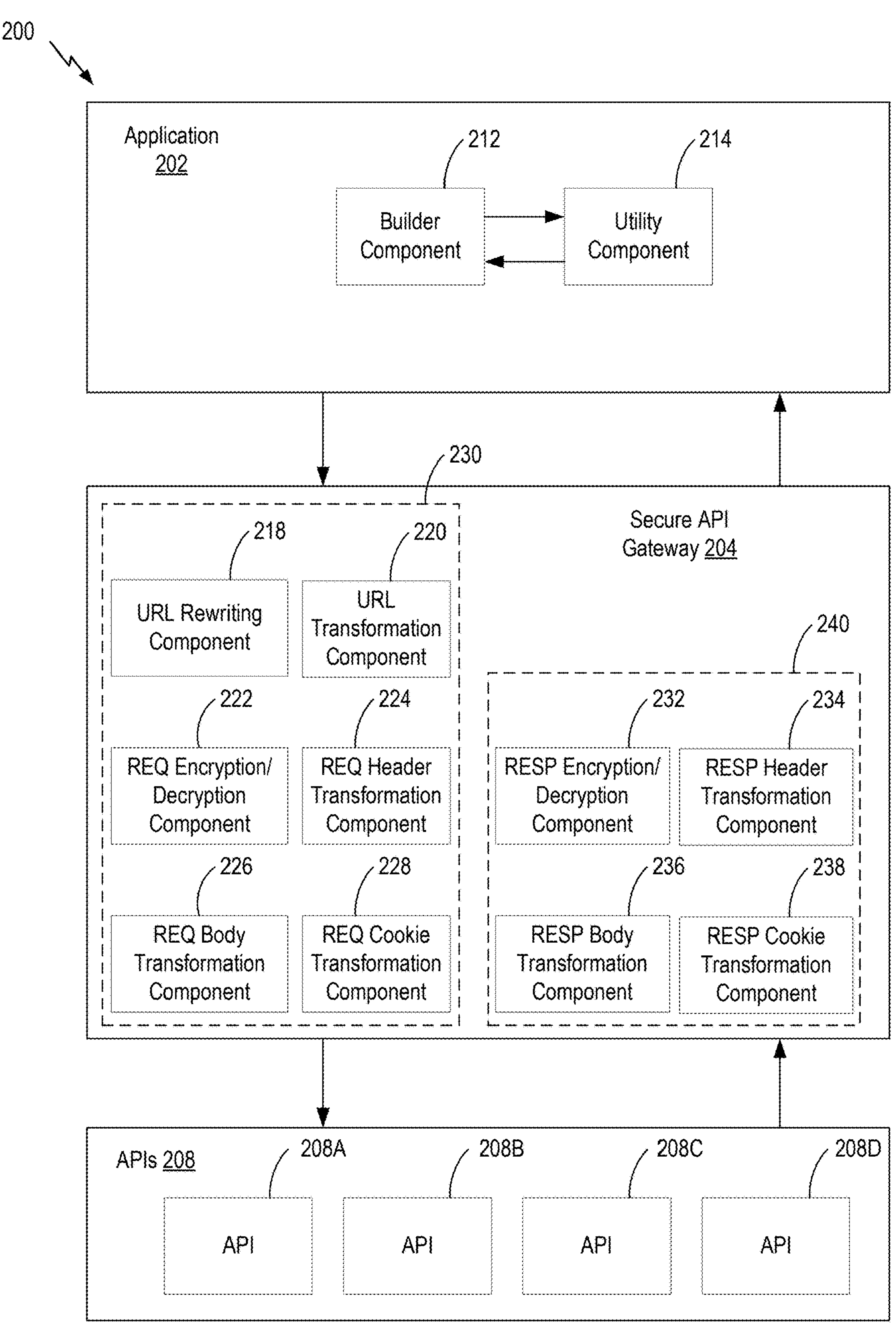
FIG. 2 depicts an example configuration of a secure API gateway configured for controlling the communication between an application and a plurality of microservices via a plurality of APIs.

FIG. 2 depicts an example configuration of a secure API gateway 204 for controlling the communication between application 202 and a plurality of microservices via a plurality of APIs 208.

As shown, system 200 includes application 202, secure API gateway 204, and a plurality of APIs 208A-D (e.g., collectively referred to as APIs 208), similar to, respectively, applications 102, secure API gateway 104, and APIs 108 described with respect to FIG. 1.

Application 202 includes builder component 212 and utility component 214. In certain aspects, one or more of these components may be implemented as JavaScript components (e.g., including JavaScript libraries, etc.).

Builder component 212 of application 202 is configured to generate an API request for processing by one or more microservices associated with APIs 208. Builder component 212 may generate the API request (e.g., by determining the data to be included in the API request). For example, builder component 212 may determine data for an API request, such as appropriate API(s) to call, based on a user input or action within application 202. Additionally, builder component 212 may determine other relevant information to be included in the API request, such as header information (e.g., data format of the data included in body information, authentication credentials, etc.), body information (e.g., data, to be processed by a microservice), cookie information, etc. Then, builder component 212 may encrypt the API request by using utility component 214.

In certain aspects, builder component 212 may be implemented (e.g., as a JavaScript component) according to an API contract that defines, for example, the structure of data to be generated by application 202 for accessing microservices by APIs 208. The data generated by builder component 212 (e.g., to be included in API request) may be structured such that it obfuscates details related to the back-end microservice architecture accessed via APIs 208. Then, the data included in the API request may be received at secure API gateway 204, for example, to be transformed in a way that makes it suitable for downstream APIs 208 (and associated microservices). Accordingly, while the data generated by builder component 212 includes transformed details that obfuscate the back-end microservice architecture, secure API gateway 204 can process (e.g., transform according to transformation rules available for access only to secure API gateway 204) the data generated by builder component 212 for further processing by downstream APIs 208, such that the back-end microservice architecture is not exposed outside of the microservices (and secure API gateway 204).

Utility component 214 of application 202 is a software component configured to encrypt the API request including the data generated by builder component 212. Additionally, utility component 214 decrypts response to the API request received from secure API gateway 204. In certain aspects, utility component 214 may be a dedicated component for handling all processes related to encrypting the API request and/or decrypting the API response (e.g., according to any encryption scheme). In certain aspects, decryption and encryption described herein may be based on any encryption scheme, such as symmetric encryption (e.g., RijndaelManaged, Advanced Encryption Standard (AES), etc.) or asymmetric encryption (e.g., Rivest-Shamir-Adleman (RSA), etc.).

In the depicted example, secure API gateway 204 includes request processing components 230 and response processing components 240. As shown, request process components 230 are software components configured to manipulate API requests received from application 202, including URL rewriting component 218, URL transformation component 220, request encryption/decryption component 222, request header transformation component 224, request body transformation component 226, and request cookie transformation component 228. For example, request processing components 230 apply the relevant service mapping and the relevant transformation rules on the data received in API request(s), such that the API request(s) may be sent to and processed by appropriate API(s) and microservice(s).

Response processing components 240 are software components configured to manipulate responses to API requests, received from microservices (e.g., via APIs 208), including response encryption/decryption component 232, response header transformation component 234, response body transformation component 236, and response cookie transformation component 238. For example, response processing components 240 apply the relevant transformation rules (e.g., for obfuscation of various portions of the data included in responses to API requests), such that the responses may be propagated to the appropriate application(s) 202, while the data included in the responses remains obfuscated between secure API gateway 204 and application(s) 202.

The processing performed by the request processing components 230 and the response processing components 240 may be based on one or more of service mapping or transformation rules retrieved from, for example, first data repository 106A or second data repository 106B (of FIG. 1). The service mapping and the transformation rules (e.g., text replacement rules) described herein may be stored as any type of structured data, such as JSON. Beneficially, API requests and responses exchanged between application 202 and secure API gateway 204 are transformed and encrypted, such that, for example, the software architecture of microservices serving application 202 is obfuscated.

URL rewriting component 218 rewrites the URL of API request, for example, from a first URL to a second URL. For example, URL rewriting component 218 may rewrite the URL by text replacement. Particularly, the URL of the API request may be rewritten based on the service mapping defined in a service dictionary (e.g., stored on first data repository 106A of FIG. 1). For example, the first URL included in the received API request (e.g., before any rewrite) may be "api.domainOne.com/ID/service-1/v1". Here, while "domainOne" may refer to domain information corresponding to, for example, the website accessed by a user (e.g., via a web browser), “domainOne” is different from, and does not reveal any portion of, domain information related to microservices. For example, “api.domainOne.com” may be a base URL, and “domainOne” may be resolved (e.g., by Domain Naming System (DNS)), such that the API request may be routed to secure API gateway 204. Similarly, other portions of the URL do not reveal any portion of the actual identifying information of any API being called or its associated microservice.

For example, the service dictionary (e.g., stored on first data repository 106A of FIG. 1) may include a service mapping that maps a first URL, “api.domainOne.com/ID/service-1/v1”, to a second URL, “api.visitor.domainTwo.com/service-1/v1”. In certain aspects, the service mapping may include textual and/or structural changes in the URL. An example textual change may include domain information being changed (e.g., from domainOne to domainTwo). Moreover, as shown in the example above, the structure of the URL may be modified (e.g., “ID” being removed in the second URL, new domain name (domainTwo) being preceded by the actual identity of the target API (visitor), etc.), such that the new URL conforms to a particular structure for an API call for accessing a microservice. Other similar structural changes may also be possible. The actual API being called (e.g., “visitor”) may be included in the second URL, which may be determined based on “ID” from the first URL and associated service mapping found in the service dictionary (e.g., by a JSON property that maps identifiers, such as “ID”, to corresponding URLs associated with APIs, such as “visitor”, etc.). Beneficially, the first URL (e.g., included in the API request, before any URL rewrite) does not reveal the actual identity of, or domain information related to, any API to be called, obfuscating the software architecture of microservices (e.g., microservices 110 of FIG. 1).

When the API request is sent from application 202 to secure API gateway 204, the domain information included in the URL of the API request may be resolved (e.g., by DNS), such that the API request may be routed to secure API gateway 204. For example, following the example described above, the URL of the API request may include a domain name, such as “domainOne.com”, which may be registered with the DNS to be resolved to a location (e.g., an IP address) associated with secure API gateway 204.

In certain aspects, multiple domain names may be resolved to the IP address associated with secure API gateway 204. For example, “domainOne.com” associated with a first website, “domainThree.com” associated with another website, “domainFour.com” associated with yet another website, etc. may all be resolved to the IP address associated with secure API gateway 204, enabling serving all of such websites as “multitenants.” Accordingly, these unique URLs included in the API requests from multiple applications 202 (e.g., different websites accessing the same microservice(s)) may be resolved such that all of such API requests are routed to secure API gateway 204. These unique URLs in the multiple API requests, received at secure API gateway 204, may then be rewritten to include the same domain names, which may be associated with the microservice(s) servicing the websites. For example, “domainOne.com”, “domainThree.com”, “domainFour.com”, etc. may all be rewritten to “domainTwo.com”, associated with the microservice(s), by URL rewriting component 218, such that these API requests received at secure API gateway 204 may all be correctly routed to the target microservice(s). In this case, the service dictionary may include the service mapping that maps all of “domainOne.com”, “domainThree.com”, “domainFour.com” to “domainTwo.com”.

URL transformation component 220 transforms the URL of API request, for example, by applying one or more text replacement rules (e.g., as defined in the transformation rules) to one or more portions of the URL. For example, the portion in the URL corresponding to the API being accessed (e.g., the portion beyond the base URL, referred to as a URL path) may be transformed based on the transformation rules (e.g., text replacement rules). For example, in the example described above with respect to URL rewriting component 218, a “pre-transformation” URL (e.g., “api.visitor.domainTwo.com/service-1/v1”) may be transformed to “api.visitor.domainTwo.com/service-1/v2”. The URL path including “/service-1/v1” (e.g., included in the API request, before any URL transformation) obfuscates and does not reveal the microservice architecture related to the actual microservice being accessed (e.g., “/service-1/v2”). In certain aspects, the relevant transformation rule may also define transformation of the structure of the URL path. For example, “/service-1/v1” may be transformed to “/a1/a2/service-1/v2”. Beneficially, the URL transformation allows the actual API identity and path information related to the microservice(s) to be obfuscated in any API request being generated and sent from application 202, for increased protection and security around the back-end microservice architecture. Secure API gateway 204 may transform (e.g., via URL transformation component 220) the API request to replace the obfuscated portions of the request with the actual information to be used (e.g., actual API and associated URL path, etc.) for proper processing by target microservice(s).

Request encryption/decryption component 222 decrypts API request (e.g., HTTP request) generated by application 202. For example, request encryption/decryption component 222 decrypts the body (e.g., encrypted body) of the generated API request (e.g., including data to be created or manipulated by API call to microservice). Additionally, other portions of the API request, including the part of the URL included in the API request corresponding to, for example, identifying information of API associated with a given microservice (e.g., the URL path after the base URL), may be encrypted (e.g., at application 202, by utility component 214) when received at secure API gateway 204, and be decrypted by request encryption/decryption component 222. The base URL of the API request (e.g., related to domain name) remains unencrypted, and is used for routing the API request from application 202 to secure API gateway 204. The API request encrypted at application 202 is decrypted by secure API gateway 204 upon being received at secure API gateway 204. Accordingly, request encryption/decryption component 222 enables the end-to-end encryption of the data included in the API request communicated between application 202 and secure API gateway 204.

Request header transformation component 224 transforms header information included in API request generated by and received from application 202. For example, request header transformation component 224 transforms header information included in API request according to one or more text replacement rules (e.g., as defined in the transformation rules), for example, to reverse the obfuscation of the header information related to, for example, data format of the body of the API request, or any other information included in the header (e.g., authentication credentials). Beneficially, by having the obfuscated information related to, for example, data format of the body or any authentication credentials, request header transformation component 224 contributes to adding an additional layer of security and protection around the software architecture of the microservices provided by a software service provider, protecting the header information (e.g., authentication details) from exploitation for any unauthorized access to microservice(s). In certain aspects, request header transformation component 224 may rename a header (e.g., a key of a key-value pair corresponding to the header, from a first name to a second name) and/or encode one or more values of the header (e.g., a value of the key-value pair corresponding to the header, from a first value to a second value).

Request body transformation component 226 transforms body information included in API request generated by and received from application 202. For example, request body transformation component 226 transforms body information included in API request according to one or more text replacement rules (e.g., as defined in the transformation rules), to reverse the obfuscation of, for example, the data structure of the data included in the body of the API request. The body of the API request may include data (e.g., to be created or manipulated by API associated with microservice) in any data structure, including, for example, JSON format. For example, when the body of the API request received from application 202 includes one or more JSON objects (e.g., that are obfuscated, at least in part), request body transformation component 226 may transform one or more portions of the JSON objects, for example, to reveal the correct names of keys of properties included in the JSON objects. For example, the obfuscation of the one or more JSON objects in the API request may be reversed by the transformation performed (e.g., according to the transformation rules) at secure API gateway 204. Accordingly, the correct body information of the API request may be used by secure API gateway 204, to provide the data to be created or manipulated in API call(s) for microservice(s).

Request cookie transformation component 228 transforms cookie information included in API request generated by and received from application 202. For example, request cookie transformation component 228 transforms cookie information included in API request according to one or more text replacement rules (e.g., as defined in the transformation rules), to reverse the obfuscation of, for example, the name of the cookie included in the API request. Moreover, additional information related to cookie may be obfuscated in the API request generated by and sent from application 202. For example, the transformation of the cookie information may also include encoding one or more values of the cookie. In certain aspects, request cookie transformation component 228 may rename a cookie (e.g., a key of a key-value pair corresponding to the cookie, from a first name to a second name) and/or encode one or more values of the cookie (e.g., a value of the key-value pair corresponding to the cookie, from a first value to a second value). In certain aspects, the cookie may be included in the API request as a header, and the cookie transformation by request cookie transformation component 228 may be a transformation performed by request header transformation component 224. The header and/or the cookie may include specific information (e.g., customized information) related to the back-end microservice architecture. Thus, transforming the header and/or the cookie protects such customized information from exploitation.

One or more other components of secure API gateway 204, including, for example, request body transformation component 226, may transform one or more portions of the body of the API request, such that, after the transformation at secure API gateway 204, the body of the API request may include additional information such as whether cookie is enabled, as well as the path information of the cookie. For example, the API request generated by and received from application 202, before the transformation, may obfuscate the information related to whether cookie is enabled, as well as the path information of the cookie. Having the cookie information obfuscated before the transformation at secure API gateway 204 can beneficially protect the cookie information from being exploited for gaining unauthorized access to any microservice resource.

Response encryption/decryption component 232 encrypts responses (e.g., HTTP responses) to API requests. For example, response encryption/decryption component 232 encrypts the body of the response (e.g., including status information related to the requested action included in API request, and/or any other data, such as requested for retrieval). The encrypted response is decrypted by application 202 upon being received at application 202. Accordingly, response encryption/decryption component 232 enables the end-to-end encryption of the data included in the response communicated between application 202 and secure API gateway 204.

Response header transformation component 234 transforms header information included in responses (e.g., HTTP responses) to API requests. For example, response header transformation component 234 modifies header information included in the responses according to one or more text replacement rules (e.g., as defined in the transformation rules), to obfuscate, for example, information related to data format of the body of the response, or any other information included in the header. Beneficially, by obfuscating the information related to data format of the body of the response, response header transformation component 234 can add an additional layer of security and protection around the software architecture of the microservices. For example, by masking information related to how any response data may be structured, response header transformation component 234 can protect information, such as which portion of the response data may be the data being retrieved, from exploitation.

Response body transformation component 236 transforms body information included in responses (e.g., HTTP responses) to API requests. For example, response body transformation component 236 transforms body information included in the responses according to one or more text replacement rules (e.g., as defined in the transformation rules), to obfuscate, for example, the data structure of the data included in the body of the responses. The body of the responses may include, for example, status data regarding the requested actions (e.g., included in API requests) in any data structure, including, for example, JSON format. For example, when the body includes one or more JSON objects, response body transformation component 236 may transform one or more portions of the JSON objects, including names of keys of properties included in the JSON objects. Accordingly, response body transformation component 236 masks the keys of properties included in the JSON objects, such that it would be impossible to determine what the values included in the JSON objects actually correspond to, for any device without the knowledge of the transformation rules. For example, the body transformation by response body transformation component 236 allows JSON path of any property (e.g., its keys) to be renamed (e.g., obfuscated), such that even if the values of the properties are exposed, the key identification or the data structure would not be exposed, preventing any particular portion of the response data, even if intercepted, to be associated with, for example, any actual JSON property.

Response cookie transformation component 238 transforms cookie information included in responses (e.g., HTTP responses) to API request. For example, response cookie transformation component 238 transforms cookie information included in the responses according to one or more text replacement rules (e.g., as defined in the transformation rules), to obfuscate, for example, the name of the cookie (e.g., any new cookie) included in the responses. For example, the transformation of the cookie information may also include encoding one or more values of the cookie. In certain aspects, response cookie transformation component 238 may rename a cookie (e.g., a key of a key-value pair corresponding to the cookie, from a first name to a second name) and/or encode one or more values of the cookie (e.g., a value of the key-value pair corresponding to the cookie, from a first value to a second value). In certain aspects, the cookie may be included in the API response as a header, and the cookie transformation by response cookie transformation component 238 may be a transformation performed by response header transformation component 234.

Moreover, additional information related to cookie may be obfuscated by one or more other components of secure API gateway 204, including, for example, response body transformation component 236, which may transform one or more portions of the body of the responses, to obfuscate additional information, such as the path information of the cookie (e.g., any new cookie).

In some embodiments, the components of secure API gateway 204 may not be separated as request processing components 230 and response processing components 240. For example, a single encryption/decryption component may be used for encrypting and decrypting requests and responses. Similarly, a single transformation component (e.g., a single set of transformation components) may be used for transforming requests and responses (e.g., without having separate transformation components for requests and responses).

APIs 208 provide the software interfaces to microservices (e.g., microservices 110 of FIG. 1), similar to APIs 108 of FIG. 1.

The URL rewrite of API requests, as well as the data encryption and the data transformation of API requests and responses, enabled by various components of secure API gateway 204 described with respect to FIG. 2, provide the technical benefits of obfuscating various types of details related to the back-end microservice architecture in the data exchanged between application 202 and secure API gateway 204, protecting these details from exploitation.

Example Communication Flow

Figure 3:
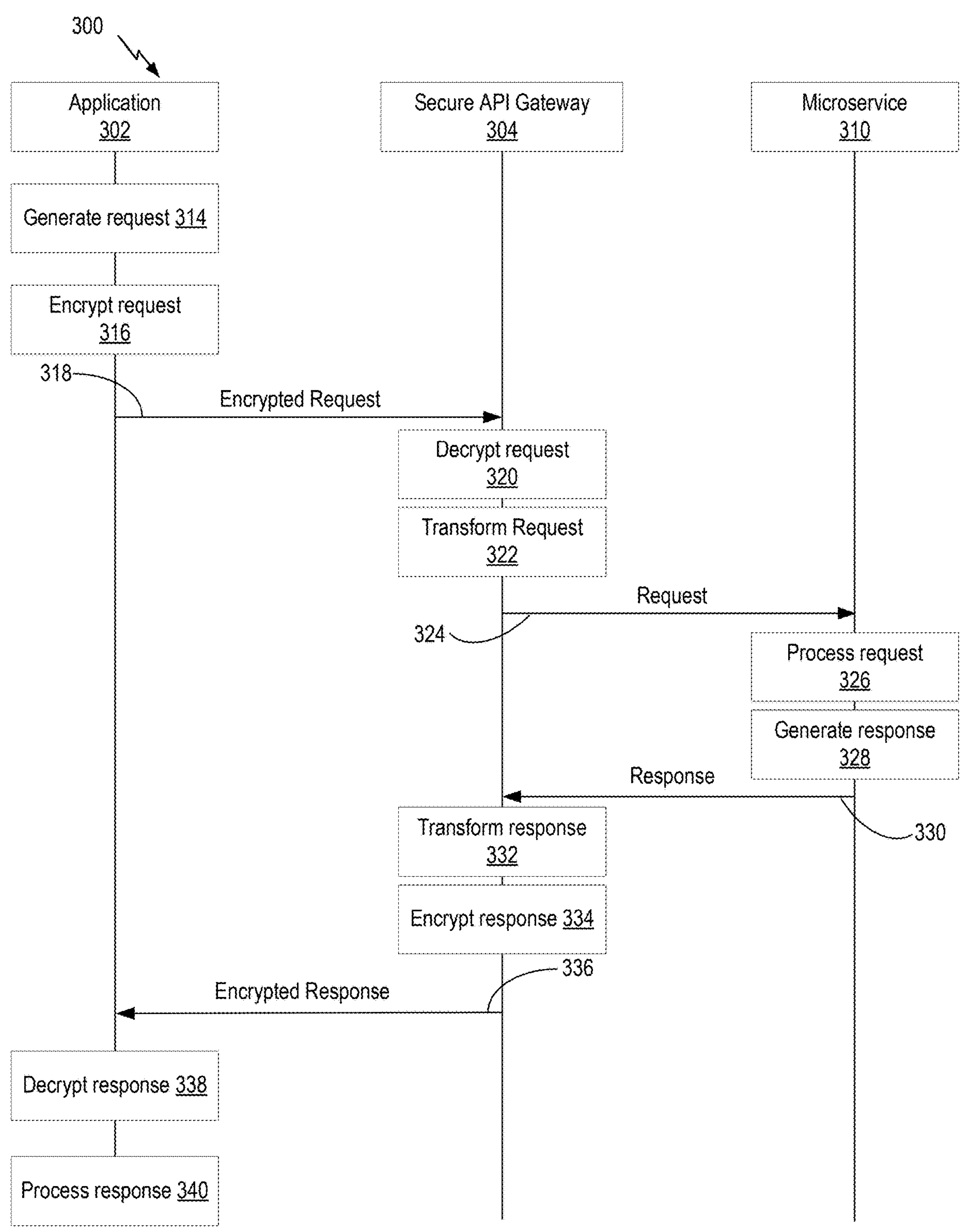
FIG. 3 depicts an example flow diagram of the communication between an application and a microservice.

FIG. 3 depicts an example flow diagram of the communication between application 302 and microservice 310 via secure API gateway 304. Application 302, secure API gateway 304, and microservice 310 correspond to, respectively, applications 102, secure API gateway 104, and microservice(s) 110 described with respect to FIG. 1.

Application 302 and secure API gateway 304 are in data communication with each other, such as by a network connection (e.g., Internet). Similarly, secure API gateway 304 and microservice 310 are in data communication with each other by a network of devices, such as the Internet. The data that are exchanged between application 302 and secure API gateway 304 and between secure API gateway 304 and microservice 310 may be, for example, HTTP messages, including API requests (e.g., HTTP requests) and API responses (e.g., HTTP responses). The steps of communication flow 300 may be performed by one or more components of system 200 described with respect to FIG. 2.

In step 314, application 302 generates API request (e.g., by utilizing builder component 212 of FIG. 2), for example, based on a user input or action received at application 302 (e.g., web browser). As described with respect to FIG. 2, the API request generated by application 302 obfuscates information related to the back-end microservice architecture provided by microservice 310, where the obfuscation of information may be "reversed" by one or more transformations performed at secure API gateway 304 (e.g., as described with respect to secure API gateway 204 of FIG. 2).

In step 316, application 302 encrypts the API request (e.g., by utilizing utility component 214 of FIG. 2). Such encryption provides the benefit of end-to-end encryption with secure API gateway 304. For example, the encrypted API request is only decrypted by secure API gateway 304. The base portion of the URL of the API request (e.g., related to domain name) remains unencrypted while other portions, such as target API identifier, of the URL of the API request may be encrypted. Accordingly, the base portion of URL may be resolved, for example, by DNS to location information (e.g., IP address) associated with secure API gateway 304, such that the encrypted API request may still be routed correctly to secure API gateway 304, while other portions of the API request, including the other portions of URL corresponding to, for example, the target API identifier, etc. are encrypted when the encrypted API request is transmitted from application 302 to secure API gateway 304.

In step 318, application 302 sends the encrypted API request to secure API gateway 304 (e.g., via the Internet).

In step 320, secure API gateway 304 decrypts the received request (e.g., by utilizing request encryption/decryption component 222 of FIG. 2). For example, secure API gateway 304 decrypts portions of the received request related to the body of the request, as well as the target API identifier included in the URL (e.g., a URL path including the target API identifier). In certain aspects, the URL path and/or the header of the request may include, respectively, a URL path encryption flag and/or a body encryption flag, where the URL path encryption flag may indicate whether the URL path is encrypted or not, and the body encryption flag may indicate whether the body of the request is encrypted or not. For example, a value of 1 may indicate a status of being encrypted, thus requiring decryption, and a value of 0 (or a lack of the flag itself) may indicate a status of not being encrypted. These flags may be used (e.g., parsed by secure API gateway 304) to determine whether any portion of the received request needs to be decrypted. In certain aspects, the encryption flag(s) may be included as part of the transformation rules (e.g., related to the URL path and/or the header).

In step 322, secure API gateway 304 transforms the decrypted request (e.g., to reverse the obfuscation of information included in the request generated by application 302 in step 314). As part of this step or as a separate step, secure API gateway 304 also retrieves service mapping and transformation rules from a data repository (e.g., first data repository 106A and second data repository 106B of FIG. 1). For example, secure API gateway 304 rewrites the URL of the API request (e.g., by utilizing URL rewriting component 218 of FIG. 2), for example, based on service mapping that maps a first URL (e.g., used for routing the API request to secure API gateway 304) to a second URL (e.g., used for correctly routing an API call associated with a target microservice 310). For example, the domain name included in the first URL may correspond to a first domain name associated with, for example, a website (e.g., accessed by an end user via application 302, such as via a web browser), while the domain name included in the second URL may correspond to a second domain name associated with the target microservice 310, where the first domain name and the second domain name are different. Moreover, secure API gateway 304 transforms the URL (e.g., a URL path including a service identifier, for example, associated with microservice 310) of the API request, based on one or more transformation rules, including one or more text replacement rules, as described herein (e.g., by utilizing URL transformation component 220 of FIG. 2). Furthermore, header information, body information, and/or cookie information of the API request may be transformed (e.g., by utilizing request header transformation component 224, request body transformation component 226, and/or request cookie transformation component 228), based on one or more transformation rules related to the different parts of the API request. The transformation of the header information, body information, and/or cookie information of the API request is described further with respect to FIGS. 4A-4B.

In step 324, secure API gateway 304 sends the transformed API request (e.g., an API call associated with a target microservice 310) to an API used for interfacing with the target microservice 310. As such, microservice 310 receives the data included in the transformed API request for processing.

In step 326, microservice 310 processes the API request (e.g., creates or manipulates any data as requested in the API request). For example, processing of the API request by microservice 310 may include, but not be limited to: saving a user profile, updating a user profile, saving a user's document, downloading a user's document, etc.

In step 328, microservice 310 generates a response (e.g., indicating success or failure of the requested action, and/or including any data requested for retrieval).

In step 330, microservice 310 sends the response to secure API gateway 304 (e.g., via the Internet).

In step 332, secure API gateway 304 transforms the received response. For example, secure API gateway 304 transforms the received response according to one or more transformation rules, as described with respect to FIG. 2 (e.g., by utilizing response header transformation component 234, response body transformation component 236, and/or response cookie transformation component 238 of FIG. 2).

In step 334, secure API gateway 304 encrypts the transformed response (e.g., by utilizing response encryption/decryption component 232 of FIG. 2). For example, secure API gateway 304 may encrypt the body of the transformed response, and include information (e.g., a flag) in the response (e.g., in the header) indicating that the body of the transformed response needs to be decrypted by application 302.

In step 336, secure API gateway 304 sends the encrypted response to application 302.

In step 338, application 302 decrypts the encrypted response (e.g., by utilizing utility component 214 of FIG. 2).

In step 340, application 302 processes the response, for example, to perform an action based on the information included in the response (e.g., provide a confirmation on a web browser, indicating successful completion of the requested action, or provide a prompt via the web browser, providing an option to retry the requested action, etc.).

The end-to-end encryption, along with the transformations of data, as described with respect to the communication flow 300 provides the technical benefit of sending and receiving requests and responses securely between application 302 and microservice 310 (e.g., via API associated with microservice 310).

Example Data Format of API Requests and Reponses

Figure 4A:
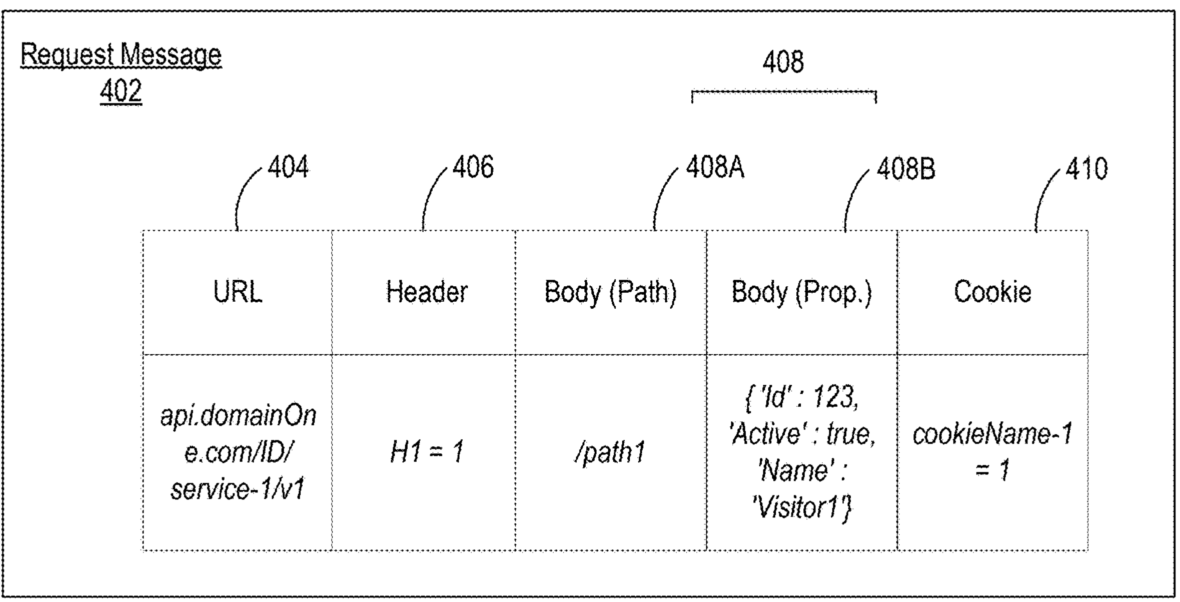
FIG. 4A depicts an example data format of a request message from an application.

FIG. 4A depicts an example data format of request message 402 (e.g., from application 102 of FIG. 1). As shown, request message 402 includes URL 404, header 406, body 408 (including path portion 408A and property portion 408B), and cookie 410.

Figure 4B:
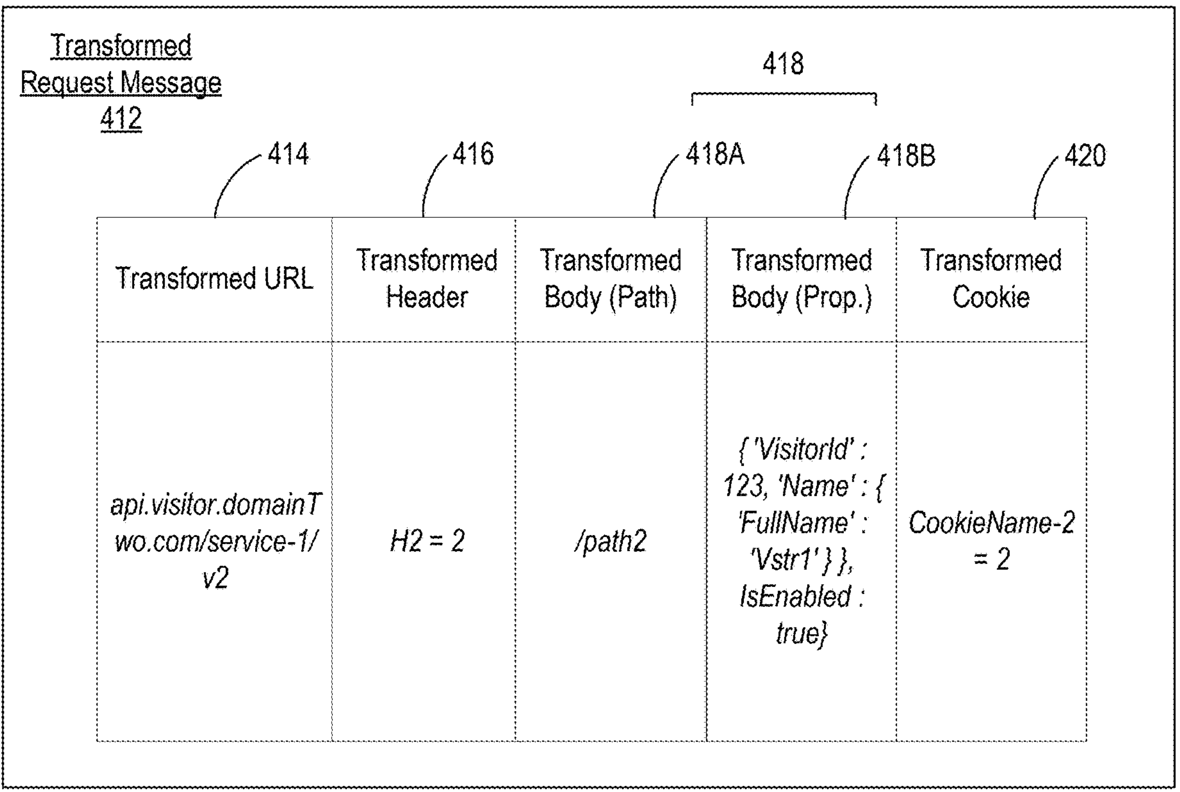
FIG. 4B depicts an example data format of a request message from an application, which has been rewritten and transformed by a secure API gateway.

FIG. 4B depicts an example data format of a transformed request message 412 (e.g., from application 102 of FIG. 1), which has been transformed by a gateway, such as secure API gateway 104 of FIG. 1. As shown, transformed request message 412 includes transformed URL 414, transformed header 416, transformed body 418 (including transformed path portion 418A and transformed property portion 418B), and transformed cookie 420. While all of the URL, header, body, and cookie are depicted as transformed in this example, in other examples, not all of the URL, header, body, and cookie may be transformed. In certain aspects, request message 402 and transformed request message 412 are HTTP messages and communicated over the Internet. As described with respect to, for example, FIG. 3, in certain aspects, transformation of URL 404 of request message 402 is preceded by URL rewrite to modify, e.g., domain portion of URL 404 of request message 402. This is done based on the service mapping defined in a service dictionary, as described with respect to FIG. 2. The service mapping may be defined as part of a structured data format (e.g., JSON), which can be readily updated to onboard new domains and/or change one or more of the service mapping rules. The service dictionary may be saved at a data repository, such as first data repository 106A of FIG. 1.

In certain aspects, the service dictionary may be used by a gateway (e.g., secure API gateway 104 of FIG. 1) to determine the service mapping to apply (e.g., for URL rewrite). For example, when API request (such as request message 402) is received by secure API gateway 104, secure API gateway 104 may process the API request to determine, for example, the URL included in the API request. Based on the URL, secure API gateway 104 may identify, from the service dictionary, the applicable service mapping to apply. Secure API gateway 104 may process the API request to determine, for example, from the URL, the domain information associated with the API request. The domain information may be used to identify the applicable service mapping from the service dictionary. For example, the service dictionary may be saved as a JSON file, and the domain information may be used to identify the relevant property(ies) (e.g., associated with the domain information), and determine the corresponding value(s) (e.g., the service mapping) included in the JSON file to determine the appropriate service mapping to apply.

Additionally, transformation rules related to transforming request message 402 into transformed request message 412 may be defined as part of the same JSON file, or as part of a separate configuration file (e.g., a separate JSON file stored on second data repository 106B of FIG. 1). The transformation rules may be used by a gateway (e.g., secure API gateway 104 of FIG. 1) to determine the transformation rule(s) to apply (e.g., for URL path/header/body/cookie transformation(s)). For example, when API request (such as request message 402) is received by secure API gateway 104, secure API gateway 104 may process the API request to determine, for example, a URL path associated with a microservice included in the API request. Based on the URL path, secure API gateway 104 may identify, from the transformation rules, the applicable transformation rule(s) to apply.

Figure 6A:
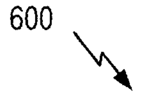
FIG. 6A depicts an example definition of service mapping used for rewriting of request URLs by a secure API gateway.
Figure 6A:
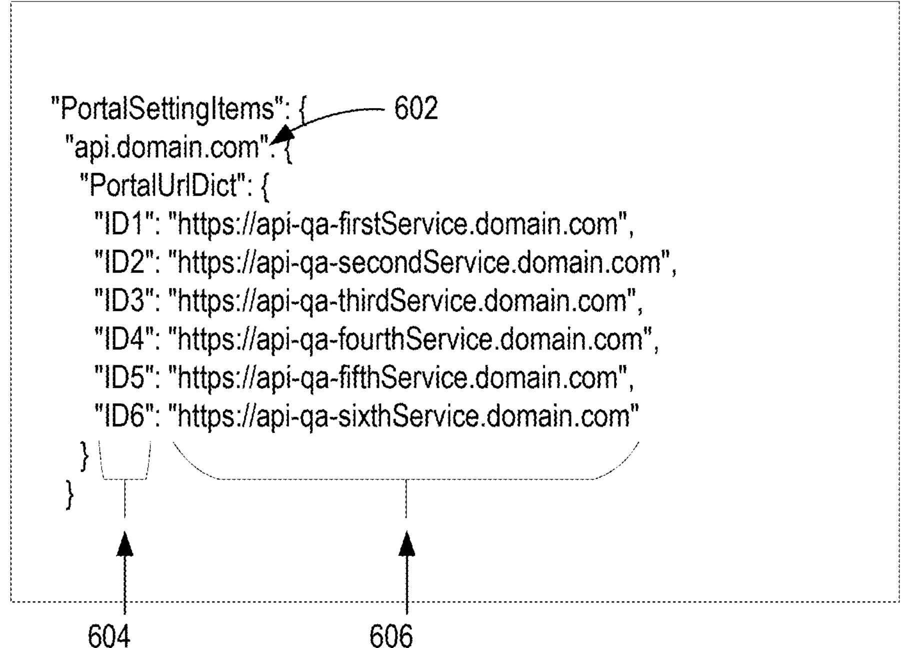
Figure 6B:
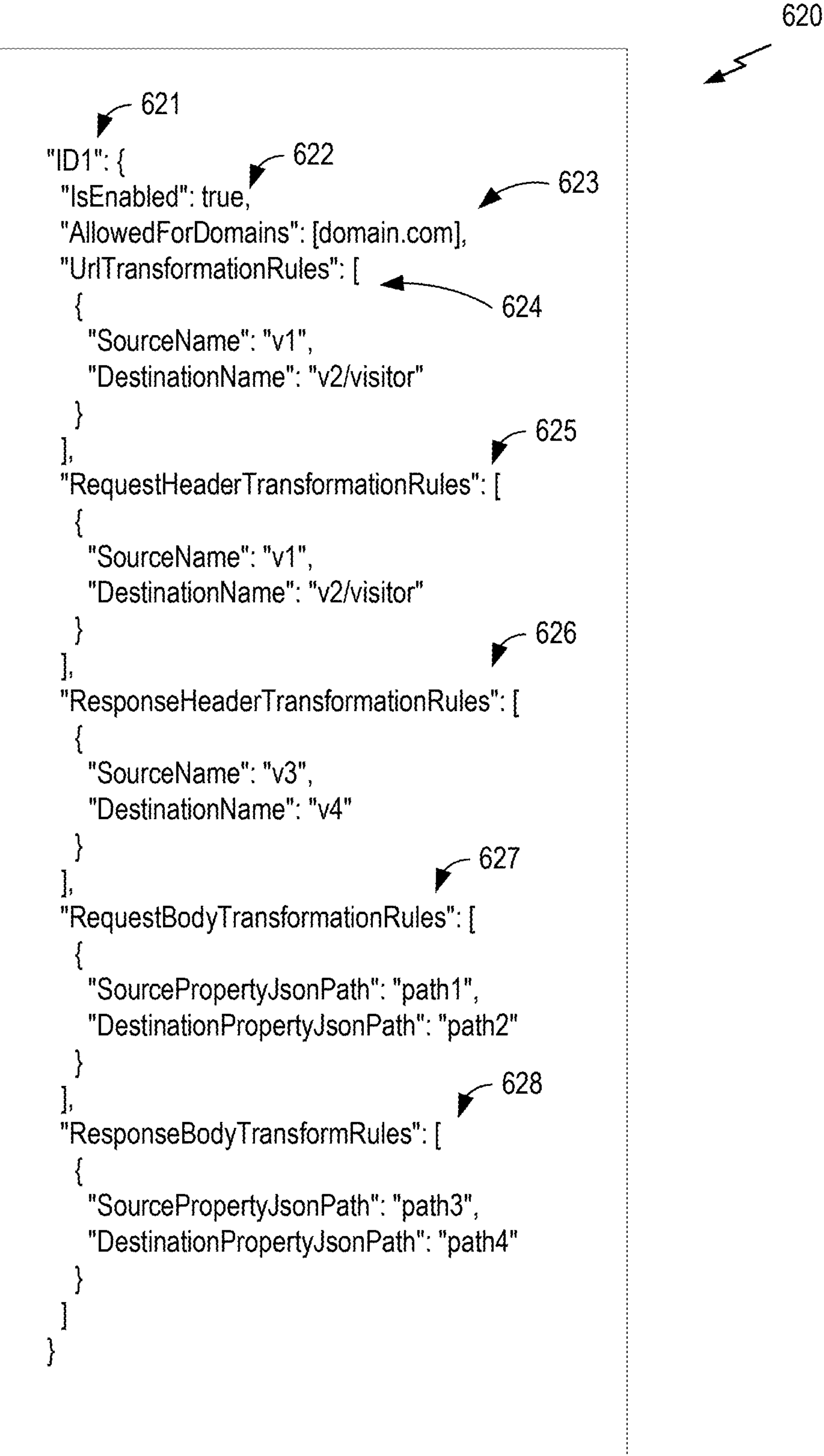
FIG. 6B depicts an example definition of transformation rules used for transformation of requests and responses by a secure API gateway.

Example service mapping and transformation rules are described further with respect to FIG. 6A and FIG. 6B.

As depicted in FIG. 4A and FIG. 4B, the transformation between URL 404 and transformed URL 414 illustrates the change in, for example, domain information and API related information, as described with respect to FIG. 2, where the domain information and the API related information shown in transformed URL 414 (e.g., "domainTwo.com", "visitor", and "v2") are not revealed in URL 404. As described herein, such URL changes (e.g., URL rewrite and URL transformation) allow the re-use of the microservices, while allowing a different "front-end" URL to be used for reaching the gateway (e.g., secure API gateway 104 of FIG. 1).

Similarly, the transformation between header 406 and transformed header 416, the transformation between body 408 and transformed body 418, and the transformation between cookie 410 and transformed cookie 420 illustrate the transformation performed by one or more components of request processing components 230, as described with respect to FIG. 2.

Figure 5A:
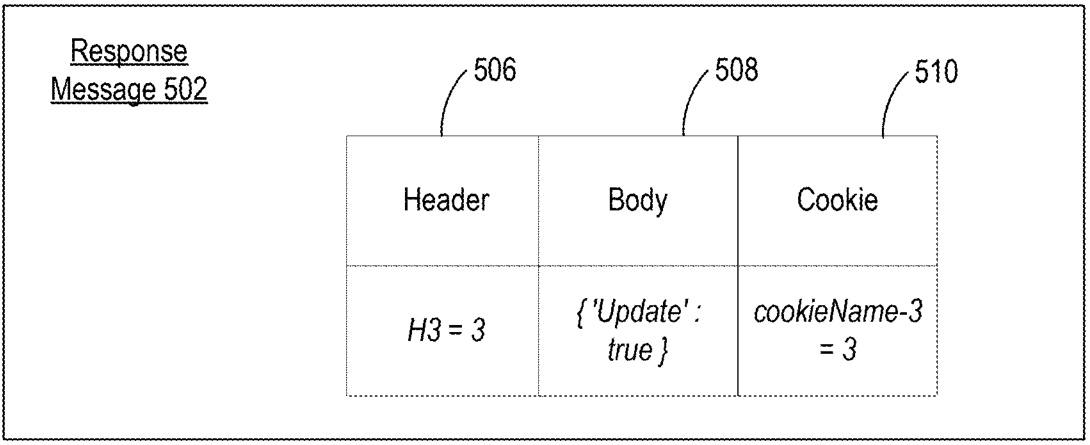
FIG. 5A depicts an example data format of a response message from a microservice.

FIG. 5A depicts an example data format of response message 502 (e.g., generated from a microservice). As shown, response message 502 includes header 506, body 508, and cookie 510.

Figure 5B:
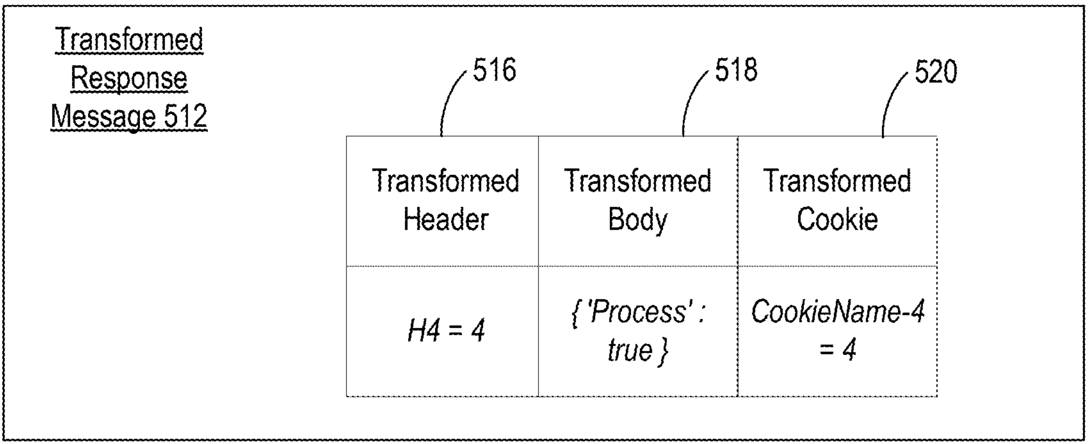
FIG. 5B depicts an example data format of a response message from a microservice, which has been transformed by a secure API gateway.

FIG. 5B depicts an example data format of a transformed response message 512 which has been transformed by a gateway, such as secure API gateway 104 of FIG. 1. Transformed response message 512 includes transformed header 516, transformed body 518, and transformed cookie 520. While all of the header, body, and cookie are depicted as transformed in this example, in other examples, not all of the header, body, and cookie may be transformed.

As shown, the transformation between response message 502 and transformed response message 512 illustrates the changes in header, body, and cookie included in the response, as described with respect to FIG. 2. For example, the response transformation is performed by one or more components of response processing components 240 based on the transformation rules (e.g., text replacement rules). The transformation rules may be saved at a data repository, such as second data repository 106B of FIG. 1. The response transformation may include renaming a header and/or a cookie (e.g., from H3/cookieName-3 to H4/cookieName-4) and/or encoding or changing the value of the header and/or the cookie (e.g., from 3 to 4), as depicted in FIG. 5A and FIG. 5B, as well as the transformation of the body of the response, including a data path (e.g., a JSON path) and associated property name (e.g., from "Update" to "Process" in the example shown in FIG. 5A and FIG. 5B).

As described with respect to, for example, FIG. 2, the transformation of the request and the response (e.g., from request message 402 to transformed request message 412, and from response message 502 to transformed response message 512), enabled by various components of secure API gateway 204 described with respect to FIG. 2, provide the technical benefits of obfuscating various types of details related to the back-end microservice architecture in the data exchanged between application 202 and secure API gateway 204, protecting these details from exploitation.

Example Service Mapping and Transformation Rules

FIG. 6A depicts service mapping 600 between a plurality of identifiers 604 (e.g., identifiers included in URLs of API requests) and a plurality of target URLs 606. Service mapping 600 may be defined based on domain information 602. Domain information 602 includes URL information that corresponds to a front-end application (e.g., developed by an organization by using microservices). While only one domain information 602 is shown, there may be additional domain information(s) 602 that correspond to additional organization(s) (such as acquired organization(s)) implementing front-end application(s) by using microservices. In certain aspects, each domain information 602 may be associated with a unique set of service mappings.

Identifiers 604 may be identified from API requests received from applications (e.g., within their URLs—"source URLs"). Identifiers 604 may correspond to unique services or functionalities provided by microservices associated with APIs, where target URLs 606 are associated with these APIs. Accordingly, once identifiers 604 have been identified from the source URLs, they may be mapped to corresponding target URLs 606 by a secure API gateway based on service mapping 600. The target URLs 606 may be used by the secure API gateway to make API calls for appropriate APIs associated with corresponding microservices for serving API requests from applications. For example, a source URL including "api.domain.com/ID1" may be rewritten to "https://api-qa-firstService.domain-.com" based on service mapping 600.

FIG. 6B depicts transformation rules 620. Transformation rules 620 are defined based on identifiers 621. In certain aspects, identifiers 621 may be the same as identifiers 604 of FIG. 6A, and while only one identifier 621 is shown, there may be more than one identifier 621 whose transformation rules are defined in transformation rules 620. Transformation rules 620 for identifier 621 include an enablement property 622, which defines whether transformation is enabled for identifier 621. Transformation rule 620 also includes a domain allowance property 623, which defines specific domain(s) for which transformation rules 620 may be applied. For example, in the depicted example, transformation rules may be applied for API requests having a URL in the domain of "domain.com". In certain aspects, if a domain is not included in domain allowance property 623, secure API gateway may invalidate a request received from the non-included domain and stop processing.

URL transformation property 624 defines transformation rule for URL for making API calls. As shown, each of the transformation rules defined in URL transformation property 624, request header transformation property 625, response header transformation property 626, request body transformation property 627, and response body transformation property 628 (e.g., such as URL transformation rule in URL transformation property 624) includes a source text and a destination text. This pair of information may be used to replace the source text in the appropriate part of a request or response with the destination text. In certain aspects, the transformation rules may include additional objects related to other parts of the request or response (e.g., cookie, etc.), where the transformation rules may also define source value and destination value (e.g., representative of encoding or changing of encoding) related to one or more values of a property. Accordingly, the transformation rules are defined as specific text replacement rules, where, for example, in the case of a request, source text obfuscates the information included in the destination text (which is used for making appropriate API calls).

As described with respect to, for example, FIG. 2, the URL rewrite of API request and the transformation of API request and response (e.g., based on service mapping 600 of FIG. 6A and transformation rules 620 of FIG. 6B), enabled by various components of secure API gateway 204 described with respect to FIG. 2, provide the technical benefits of obfuscating various types of details related to the back-end microservice architecture in the data exchanged between application 202 and secure API gateway 204 of FIG. 2, protecting these details from exploitation.

Figure 7:
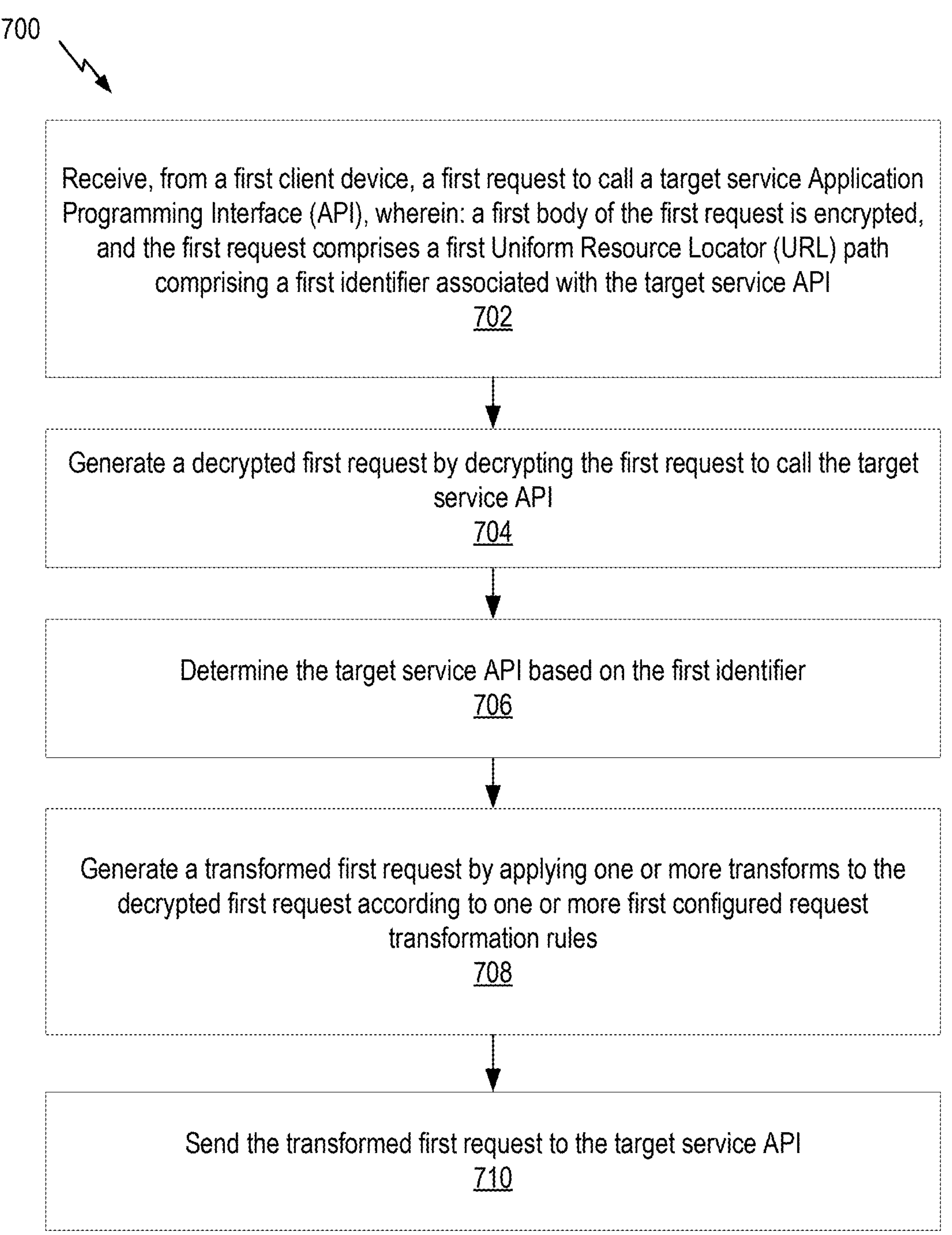
FIG. 7 depicts an example flowchart illustrating a method for controlling the communication between one or more applications and a microservice.

Example Method of Securing Communications Between Applications and Microservices FIG. 7 depicts an example flowchart illustrating a method 700 for securing communication between one or more applications and one or more microservices. Various steps of method 700 may be performed, at least in part, by one or more software components described herein with respect to, for example, secure API gateway 104, 204, and 304 of, respectively, FIGS. 1-3, as well as by the processing system described with respect to FIG. 8.

Method 700 begins at step 702 with receiving, from a first client device, a first request to call a target service API. The first request includes a first body that is encrypted. The first request also includes a first URL path having a first identifier associated with the target service API. For example, the first identifier may be used to determine the target service API to call, for rewriting a URL of the first request, as described with respect to FIG. 2. In some embodiments, the URL of the first request may include a first portion, which includes the first URL path that is encrypted, and a second portion, which includes a base URL that is not encrypted. Accordingly, the base URL may be used for correctly routing the first request from the first client device to, for example, secure API gateway 204 of FIG. 2, while other portions of the first URL may be transformed and encrypted to obfuscate information related to the actual microservice architecture, as described with respect to FIG. 2.

Method 700 then proceeds to step 704 with generating a decrypted first request by decrypting the first request to call the target service API. As described with respect to FIG. 2, the decrypted first request may be generated by request encrypting/decrypting component 222. In some embodiments, generating the decrypted first request may include decrypting the first URL path and the first body. For example, decrypting the first URL path and the first body may be based on determining that the first request includes the first URL path that is encrypted and the first body that is encrypted based on, respectively, a URL path encryption flag included in the URL and a body encryption flag included in the first header.

Method 700 then proceeds to step 706 with determining the target service API based on the first identifier. As described with respect to, for example, FIG. 2, the target service API may be determined based on service mapping (e.g., as defined in a service dictionary stored at first data repository 106A of FIG. 1) that associates the target service API to the first identifier.

Method 700 then proceeds to step 708 with generating a transformed first request by applying one or more transforms to the decrypted first request according to one or more first configured request transformation rules. The one or more first configured request transformation rules include one or more of: transforming the first URL path of the decrypted first request to a second URL path of the decrypted first request, transforming a first header of the decrypted first request to a second header of the decrypted first request, transforming the first body of the decrypted first request to a second body of the decrypted first request, or transforming a first cookie of the decrypted first request to a second cookie of the decrypted first request. As described with respect to FIG. 2, the one or more first configured request transformation rules may be defined as text replacement rules, stored at a data repository accessible by, for example, secure API gateway 104, such as second data repository 106B of FIG. 1.

Method 700 then proceeds to step 710 with sending the transformed first request to the target service API. As described with respect to FIG. 2, the transformed first request may be routed to the target service API based on a URL that has been rewritten (e.g., from the original URL included in the first request as received from the first application) by, for example, URL rewriting component 218 of FIG. 2. As described herein, the URL rewrite is performed based on service mapping where the original URL is different from, and thus does not reveal, the actual URL associated with the target service API when the first request is generated at the first application.

In some embodiments, method 700 further includes receiving a response from the target service API, generating a transformed response by applying one or more transforms to the response according to one or more configured response transformation rules, generating an encrypted response by encrypting the transformed response, and sending the encrypted response to the first client device. The one or more configured response transformation rules may include one or more of: transforming a first header of the response to a second header of the response, transforming a first body of the response to a second body of the response, or transforming a first cookie of the response to a second cookie of the response.

In some embodiments, applying the one or more transforms to the decrypted first request according to the one or more first configured request transformation rules includes transforming the first URL path of the decrypted first request to the second URL path of the decrypted first request based on one or more text replacement rules (e.g., as described with respect to FIG. 2).

Moreover, in some embodiments, applying the one or more transforms to the decrypted first request according to the one or more first configured request transformation rules includes transforming the first header of the decrypted first request to the second header of the decrypted first request. Transforming the first header to the second header may include one or more of: renaming the first header, or encoding one or more values of the first header.

Further, in some embodiments, applying the one or more transforms to the decrypted first request according to the one or more first configured request transformation rules includes transforming the first body of the decrypted first request to the second body of the decrypted first request, including transforming at least one JSON path and associated property name (e.g., key information).

Additionally, in some embodiments, applying the one or more transforms to the decrypted first request according to the one or more first configured request transformation rules includes transforming the first cookie of the decrypted first request to the second cookie of the decrypted first request, including one or more of: renaming the first cookie, or encoding one or more values of the first cookie. As described herein with respect to FIG. 2, other aspects related to the cookie may also be transformed, including information related to whether any cookie may be enabled, cookie path information, etc.

In some embodiments, the method 700 further includes receiving, from a second client device, a second request to call the target service API, generating a decrypted second request by decrypting the second request to call the target service API, determining the target service API based on the second identifier, generating a transformed second request by applying one or more transforms to the decrypted second request according to one or more second configured request transformation rules, and sending the transformed second request to the target service API. The second request may include a first body which is encrypted. The second request may also include a third URL path having a second identifier, different than the first identifier, associated with the target service API. Moreover, the one or more transforms applied to the decrypted second request are different than the one or more transforms applied to the decrypted first request.

In some embodiments, the first request is received from a first front-end client (e.g., a first front-end application), and the second request is received from a second front-end client (e.g., a second front-end application), different than the first front-end client. The first identifier and the one or more transforms applied to the decrypted first request are associated with the first front-end client, and the second identifier and the one or more transformations applied to the decrypted second request are associated with the second front-end client.

In some embodiments, method 700 further includes retrieving, from a service dictionary (e.g., service dictionary described herein with respect to FIG. 2), service mapping data that associates a target URL corresponding to the target service API to the first identifier. Retrieving the service mapping data from the service dictionary may include retrieving the service mapping data from the service dictionary stored on a local cache, or on a remote memory device. For example, retrieving the mapping data from the service dictionary may include retrieving the mapping data via one or more APIs associated with the service dictionary. In certain embodiments, method 700 may also include rewriting a URL of the first request based on the target URL corresponding to the target service API, wherein sending the transformed first request to the target service API comprises sending the transformed first request to the target service API based on the rewritten URL of the first request.

Method 700 and related methods described above illustrate how certain aspects of the present disclosure improve security in a microservice architecture. For example, steps 702-710 and other methods described above may be performed, at least in part, at a gateway, such as secure API gateway 204 of FIG. 2, which secures the communication between applications (e.g., application 202 of FIG. 2) and APIs (e.g., APIs 208 of FIG. 2). For example, method 700 includes steps, such as steps 704 and 708, to decrypt and transform a request to reverse the obfuscation of details related to the back-end microservice architecture in the request, which was, for example, purposefully generated to obfuscate the details related to the back-end microservice architecture. The transformation of the request (e.g., in a way only known to secure API gateway 204 of FIG. 2) enables the request to be properly processed by downstream APIs (e.g., APIs 208 of FIG. 2). These methods allow the actual information related to the microservice architecture to be protected from being exposed for exploitation, while enabling the actual information to be properly used for API calls for microservices to serve the requests. As described herein, secure API gateway 204 (e.g., performing various steps of method 700) may also serve as a single entry point for communications with microservices from any number of front-end applications. This gateway thus enables easy extensibility of the back-end microservices to new applications (such as for multiple entities). In this way, the gateway, performing various steps of method 700, supports multi-tenancy across the multiple entities. Accordingly, aspects described with respect to method 700 improve security and extensibility of microservice architectures.

Note that FIG. 7 is just one example of a method, and other methods including fewer, additional, or alternative operations are possible consistent with this disclosure.

Example Processing System

Figure 8:
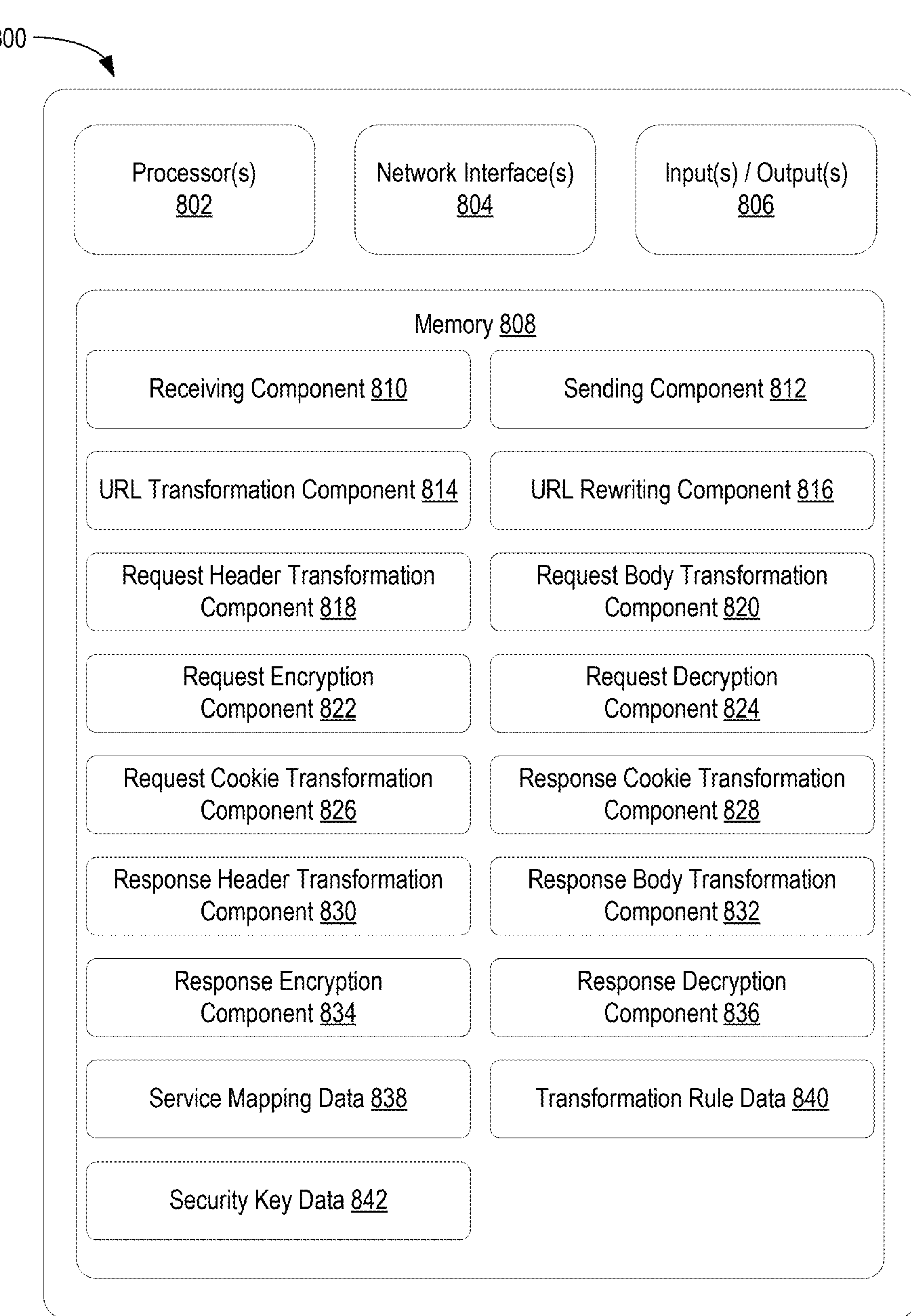
FIG. 8 depicts an example processing system configured to perform the methods described herein.

FIG. 8 depicts an example processing system 800 configured to perform the methods described herein. Processing system 800 includes one or more processors 802, one or more network interfaces 804, one or more inputs and/or outputs 806, and memory 808. For example, secure API gateway 104, 204, and 304 of, respectively, FIGS. 1-3 may be implemented by processing system 800.

Processing system 800 may be implemented in an electronic device configured to execute computer-executable instructions, such as those derived from compiled computer code, including, for example, desktop computers, tablet computers, server computers, cloud-based processing devices, and others.

One or more processors 802 are generally configured to retrieve and execute instructions stored in one or more memories, including local memories like memory 808, as well as remote memories and data stores. For example, a data bus may be configured to transmit programming instructions and application data among processor(s) 802, network interface(s) 804, and/or memory 808. In certain embodiments, processor(s) 802 may be representative of one or more central processing units (CPUs), graphics processing units (GPUs), tensor processing units (TPUs), accelerators, and other processing devices.

One or more network interfaces 804 provide processing system 800 with access to external networks and thereby to external processing systems. Network interfaces 804 can generally be any hardware and/or software capable of transmitting and/or receiving data via a wired or wireless network connection. Accordingly, network interfaces 804 may include a communication transceiver for sending and/or receiving any wired and/or wireless communication. For example, network interfaces 804 may be used by secure API gateway 204 to communicate with application 202 and APIs 208.

One or more inputs and/or outputs 806 may include any device, mechanism, system, interactive display, and/or various other hardware and software components for communicating information between processing system 800 and a user or operator of processing system 800, such as, for example, an operator of secure API gateway 204 (of FIG. 2). For example, inputs and/or outputs 806 may include input hardware, such as a keyboard, touch screen, button, microphone, speaker, and/or other device for receiving inputs from a user and sending outputs to a user.

Memory 808 is a computer-readable medium, which may be a volatile memory, such as a random access memory (RAM), or a nonvolatile memory, such as nonvolatile random access memory (NVRAM), or the like.

Memory 808 includes receiving component 810 and sending component 812. Receiving component 810 and sending component 812 may be software components configured for receiving (e.g., via network interface(s) 804), for example, API request from a software application, such as application 202 of FIG. 2 (e.g., running on a client device), and sending (e.g., via network interface(s) 804), for example, API call for microservice (e.g., via API 208 of FIG. 2), respectively. Memory 808 further includes URL transformation component 814 and URL rewriting component 816, corresponding to, respectively, URL transformation component 220 and URL rewriting component 218 of FIG. 2. Moreover, memory 808 includes request header transformation component 818, request body transformation component 820, request encryption component 822, request decryption component 824, and request cookie transformation component 826, corresponding to respective components of request processing components 230 of FIG. 2. Additionally, memory 808 includes response header transformation component 830, response body transformation component 832, response encryption component 834, response decryption component 836, and response cookie transformation component 828, corresponding to respective components of response processing components 240 of FIG. 2. In certain aspects, similar to the corresponding component of FIG. 2, request encryption component 822 and request decryption component 824 may be implemented as a combined component. Similarly, response encryption component 834 and response decryption component 836 may be implemented as a combined component. In certain aspects, request encryption/decryption component 222 of FIG. 2 may be configured to only decrypt API requests, while response encryption/decryption component 232 of FIG. 2 may be configured to only encrypt API responses. In this example, request encryption/decryption component 222 of FIG. 2 may be implemented by request decryption component 824, and response encryption/decryption component 232 of FIG. 2 may be implemented by response encryption component 834.

Furthermore, memory 808 includes service mapping data 838, transformation rules data 840, and security key data 842. Service mapping data 838 and transformation rules data 840 may be retrieved from, for example, first data repository 106A and second data repository 106B of FIG. 1, as described herein with respect to FIG. 2. Security key data 842 may be security key(s) used for the description and encryption described herein with respect to FIG. 2.

Note that FIG. 8 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method, comprising: receiving, from a first client device, a first request to call a target service Application Programming Interface (API), wherein: a first body of the first request is encrypted, and the first request comprises a first Uniform Resource Locator (URL) path comprising a first identifier associated with the target service API; generating a decrypted first request by decrypting the first request to call the target service API; determining the target service API based on the first identifier; generating a transformed first request by applying one or more transforms to the decrypted first request according to one or more first configured request transformation rules, including one or more of: transforming the first URL path of the decrypted first request to a second URL path of the decrypted first request; transforming a first header of the decrypted first request to a second header of the decrypted first request; transforming the first body of the decrypted first request to a second body of the decrypted first request; or transforming a first cookie of the decrypted first request to a second cookie of the decrypted first request; and sending the transformed first request to the target service API.

Clause 2: The method in accordance with Clause 1, further comprising: receiving a response from the target service API; generating a transformed response by applying one or more transforms to the response according to one or more configured response transformation rules, including one or more of: transforming a first header of the response to a second header of the response; transforming a first body of the response to a second body of the response; or transforming a first cookie of the response to a second cookie of the response; generating an encrypted response by encrypting the transformed response; and sending the encrypted response to the first client device.

Clause 3: The method in accordance with any one of Clauses 1-2, wherein applying the one or more transforms to the decrypted first request according to the one or more first configured request transformation rules comprises transforming the first URL path of the decrypted first request to the second URL path of the decrypted first request based on one or more text replacement rules.

Clause 4: The method in accordance with any one of Clauses 1-3, wherein applying the one or more transforms to the decrypted first request according to the one or more first configured request transformation rules comprises transforming the first header of the decrypted first request to the second header of the decrypted first request, including one or more of: renaming the first header; or encoding one or more values of the first header.

Clause 5: The method in accordance with any one of Clauses 1-4, wherein applying the one or more transforms to the decrypted first request according to the one or more first configured request transformation rules comprises transforming the first body of the decrypted first request to the second body of the decrypted first request, including transforming at least one JavaScript Object Notation (JSON) path and associated property name.

Clause 6: The method in accordance with any one of Clauses 1-5, wherein applying the one or more transforms to the decrypted first request according to the one or more first configured request transformation rules comprises transforming the first cookie of the decrypted first request to the second cookie of the decrypted first request, including one or more of: renaming the first cookie; or encoding one or more values of the first cookie.

Clause 7: The method in accordance with Clause 2, wherein the decrypting and the encrypting are done according to a Rivest-Shamir-Adleman (RSA) encryption scheme.

Clause 8: The method in accordance with any one of Clauses 1-7, further comprising: receiving, from a second client device, a second request to call the target service API, wherein: a first body of the second request is encrypted, and the second request comprises a third URL path comprising a second identifier, different than the first identifier, associated with the target service API; generating a decrypted second request by decrypting the second request to call the target service API; determining the target service API based on the second identifier; generating a transformed second request by applying one or more transforms to the decrypted second request according to one or more second configured request transformation rules; and sending the transformed second request to the target service API, wherein the one or more transforms applied to the decrypted second request are different than the one or more transforms applied to the decrypted first request.

Clause 9: The method in accordance with Clause 8, wherein: the first request is received from a first front-end client, and the second request is received from a second front-end client, different than the first front-end client.

Clause 10: The method in accordance with Clause 9, wherein: the first identifier and the one or more transforms applied to the decrypted first request are associated with the first front-end client, and the second identifier and the one or more transforms applied to the decrypted second request are associated with the second front-end client.

Clause 11: The method in accordance with any one of Clauses 1-10, further comprising: retrieving, from a service dictionary, service mapping data that associates a target URL corresponding to the target service API to the first identifier.

Clause 12: The method in accordance with Clause 11, wherein retrieving the service mapping data from the service dictionary comprises retrieving the service mapping data from the service dictionary stored on a local cache.

Clause 13: The method in accordance with any one of Clauses 11-12, wherein retrieving the service mapping data from the service dictionary comprises retrieving the service mapping data from the service dictionary stored on a remote memory device.

Clause 14: The method in accordance with any one of Clauses 11-13, wherein retrieving the service mapping data from the service dictionary comprises retrieving the service mapping data via one or more APIs associated with the service dictionary.

Clause 15: The method in accordance with any one of Clauses 11-14, further comprising: rewriting a URL of the first request based on the target URL corresponding to the target service API, wherein sending the transformed first request to the target service API comprises sending the transformed first request to the target service API based on the rewritten URL of the first request.

Clause 16: The method in accordance with any one of Clauses 1-15, wherein a URL of the received first request comprises: a first portion comprising the first URL path that is encrypted, and a second portion comprising a base URL that is not encrypted.

Clause 17: The method in accordance with Clause 16, wherein generating the decrypted first request comprises decrypting the first URL path and the first body.

Clause 18: The method in accordance with Clause 17, wherein decrypting the first URL path and the first body is based on determining that the first request comprises the first URL path that is encrypted and the first body that is encrypted based on, respectively, a URL path encryption flag included in the URL and a body encryption flag included in the first header.

Clause 19: A processing system, comprising: a memory comprising computer-executable instructions; and a processor configured to execute the computer-executable instructions and cause the processing system to perform a method in accordance with any one of Clauses 1-18.

Clause 20: A processing system, comprising means for performing a method in accordance with any one of Clauses 1-18.

Clause 21: A non-transitory computer-readable medium storing program code for causing a processing system to perform the steps of any one of Clauses 1-18.

Clause 22: A computer program product embodied on a computer-readable storage medium comprising code for performing a method in accordance with any one of Clauses 1-18.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a memory," "the processor," "the memory," etc.), unless otherwise specifically stated, should be understood to refer to one or more elements (e.g., "one or more processors," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., a system) to perform functions, one element may be configured to cause the other element to perform all functions, or more than one element may collectively be configured to cause the other element to perform the functions. Unless specifically stated otherwise, the term "some" refers to one or more.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) (logic) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S. C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums corresponding to secure and efficient management of microservices. It should also be understood that these embodiments are merely exemplary and are not intended to limit the scope of this disclosure.

What is claimed is:

1. A method, comprising:

receiving, from a first client device, a first request to call a target service Application Programming Interface (API), wherein:
  a first body of the first request is encrypted, and
  the first request comprises a first Uniform Resource Locator (URL) path comprising a first identifier mapped to a target URL corresponding to the target service API;

generating a decrypted first request by decrypting the first request to call the target service API;

determining the target service API based on the first identifier;

generating a transformed first request by applying one or more transforms to the decrypted first request according to one or more first configured request transformation rules, including one or more of:
  transforming the first URL path of the decrypted first request to a second URL path of the decrypted first request;
  transforming a first header of the decrypted first request to a second header of the decrypted first request;
  transforming the first body of the decrypted first request to a second body of the decrypted first request; or
  transforming a first cookie of the decrypted first request to a second cookie of the decrypted first request; and sending the transformed first request to the target service API.

2. The method of claim 1, further comprising:

receiving a response from the target service API;

generating a transformed response by applying one or more transforms to the response according to one or more configured response transformation rules, including one or more of:
  transforming a first header of the response to a second header of the response;
  transforming a first body of the response to a second body of the response; or
  transforming a first cookie of the response to a second cookie of the response;

generating an encrypted response by encrypting the transformed response; and sending the encrypted response to the first client device.

3. The method of claim 2, wherein the decrypting and the encrypting are done according to a Rivest-Shamir-Adleman (RSA) encryption scheme.

4. The method of claim 1, wherein applying the one or more transforms to the decrypted first request according to the one or more first configured request transformation rules comprises transforming the first URL path of the decrypted first request to the second URL path of the decrypted first request based on one or more text replacement rules.

5. The method of claim 1, wherein applying the one or more transforms to the decrypted first request according to the one or more first configured request transformation rules comprises transforming the first header of the decrypted first request to the second header of the decrypted first request, including one or more of:

renaming the first header; or encoding one or more values of the first header.

6. The method of claim 1, wherein applying the one or more transforms to the decrypted first request according to the one or more first configured request transformation rules comprises transforming the first body of the decrypted first request to the second body of the decrypted first request, including transforming at least one JavaScript Object Notation (JSON) path and associated property name.

7. The method of claim 1, wherein applying the one or more transforms to the decrypted first request according to the one or more first configured request transformation rules comprises transforming the first cookie of the decrypted first request to the second cookie of the decrypted first request, including one or more of:

renaming the first cookie; or encoding one or more values of the first cookie.

8. The method of claim 1, further comprising:
receiving, from a second client device, a second request to call the target service API, wherein:
a first body of the second request is encrypted, and
the second request comprises a third URL path comprising a second identifier, different than the first identifier, associated with the target service API;
generating a decrypted second request by decrypting the second request to call the target service API;
determining the target service API based on the second identifier;
generating a transformed second request by applying one or more transforms to the decrypted second request according to one or more second configured request transformation rules; and
sending the transformed second request to the target service API,
wherein the one or more transforms applied to the decrypted second request are different than the one or more transforms applied to the decrypted first request.

9. The method of claim 8, wherein:
the first request is received from a first front-end client, and
the second request is received from a second front-end client, different than the first front-end client.

10. The method of claim 9, wherein:
the first identifier and the one or more transforms applied to the decrypted first request are associated with the first front-end client, and
the second identifier and the one or more transforms applied to the decrypted second request are associated with the second front-end client.

11. The method of claim 1, further comprising:
retrieving, from a service dictionary, service mapping data that maps the target URL corresponding to the target service API to the first identifier.

12. The method of claim 11, wherein retrieving the service mapping data from the service dictionary comprises retrieving the service mapping data from the service dictionary stored on a local cache.

13. The method of claim 11, wherein retrieving the service mapping data from the service dictionary comprises retrieving the service mapping data from the service dictionary stored on a remote memory device.

14. The method of claim 11, wherein retrieving the service mapping data from the service dictionary comprises retrieving the service mapping data via one or more APIs associated with the service dictionary.

15. The method of claim 11, further comprising:
rewriting a URL of the first request based on the target URL corresponding to the target service API,
wherein sending the transformed first request to the target service API comprises sending the transformed first request to the target service API based on the rewritten URL of the first request.

16. The method of claim 1, wherein a URL of the received first request comprises:
a first portion comprising the first URL path that is encrypted, and
a second portion comprising a base URL that is not encrypted.

17. The method of claim 16, wherein generating the decrypted first request comprises decrypting the first URL path and the first body.

18. The method of claim 17, wherein decrypting the first URL path and the first body is based on determining that the first request comprises the first URL path that is encrypted and the first body that is encrypted based on, respectively, a URL path encryption flag included in the URL and a body encryption flag included in the first header.

19. A processing system, comprising: a memory comprising computer-executable instructions; and a processor configured to execute the computer-executable instructions and cause the processing system to:
receive, from a first client device, a first request to call a target service Application Programming Interface (API), wherein:
a first body of the first request is encrypted, and
the first request comprises a first Uniform Resource Locator (URL) path comprising a first identifier mapped to a target URL corresponding to the target service API;
generate a decrypted first request by decrypting the first request to call the target service API;
determine the target service API based on the first identifier;
generate a transformed first request by applying one or more transforms to the decrypted first request according to one or more first configured request transformation rules, including one or more of:
transforming the first URL path of the decrypted first request to a second URL path of the decrypted first request;
transforming a first header of the decrypted first request to a second header of the decrypted first request;
transforming the first body of the decrypted first request to a second body of the decrypted first request; or
transforming a first cookie of the decrypted first request to a second cookie of the decrypted first request; and
send the transformed first request to the target service API.

20. A method, comprising:
receiving, from a client device, a request to call a target service Application Programming Interface (API);
retrieving, from a data repository, a first structured configuration data comprising service mapping data and a second structured configuration data comprising transformation rule data;
parsing the request to call the target service API to determine a plurality of portions of the request, wherein the request comprises one or more of:
a first Uniform Resource Locator (URL) comprising:
a base URL that is not encrypted, and
a URL path comprising an identifier associated with the target service API,
a header,
a body, or
a cookie,
wherein the URL path and the body are encrypted;
generating a second URL by rewriting at least a portion of the first URL based on the service mapping data, wherein the second URL is associated with the target service API;
generating a decrypted request by decrypting the URL path of the request and the body of the request;
determining the target service API based on the identifier;
identifying one or more applicable transformation rules of the transformation rule data, applicable for the request, based on at least one of the determined portions of the request;

generating a transformed request by transforming, based on the identified one or more applicable transformation rules, one or more of: the URL path, the header, the body, or the cookie; and sending the transformed request to the target service API based on the second URL.

* * * * *